(12) United States Patent
Vikberg et al.

(10) Patent No.: US 11,134,418 B2
(45) Date of Patent: Sep. 28, 2021

(54) COMMUNICATION DEVICE, NETWORK NODE, RADIO NETWORK NODE AND METHODS PERFORMED THEREIN FOR HANDLING COMMUNICATION IN A COMMUNICATION NETWORK

(71) Applicant: Telefonaktiebolaget LM Ericsson (publ), Stockholm (SE)

(72) Inventors: Jari Vikberg, Järna (SE); Tomas Hedberg, Nacka (SE); Håkan Olofsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/648,131

(22) PCT Filed: Oct. 12, 2017

(86) PCT No.: PCT/SE2017/051007
§ 371 (c)(1),
(2) Date: Mar. 17, 2020

(87) PCT Pub. No.: WO2019/074411
PCT Pub. Date: Apr. 18, 2019

(65) Prior Publication Data
US 2020/0280890 A1   Sep. 3, 2020

(51) Int. Cl.
*H04W 36/00* (2009.01)
*H04W 36/14* (2009.01)
*H04W 84/04* (2009.01)

(52) U.S. Cl.
CPC ... *H04W 36/0016* (2013.01); *H04W 36/0033* (2013.01); *H04W 36/0066* (2013.01); *H04W 36/14* (2013.01); *H04W 84/042* (2013.01)

(58) Field of Classification Search
CPC ............. H04W 36/0016; H04W 36/08; H04W 36/0033; H04W 36/14; H04W 84/042;
(Continued)

(56) References Cited

U.S. PATENT DOCUMENTS

2004/0137902 A1* 7/2004 Chaskar ................ H04W 36/30
455/436
2008/0254833 A1* 10/2008 Keevill ................ H04W 24/02
455/558
(Continued)

FOREIGN PATENT DOCUMENTS

WO   2008157633 A2   12/2008
WO   2011098308 A1   8/2011

OTHER PUBLICATIONS

"3GPP TS 23.402 V15.1.0", 3rd Generation Partnership Project; Technical Specification Group Services and System Aspects; Architecture enhancements for non-3GPP accesses (Release 15), Sep. 2017, pp. 1-313.
(Continued)

*Primary Examiner* — Allahyar Kasraian
(74) *Attorney, Agent, or Firm* — Murphy, Bilak & Homiller, PLLC

(57) ABSTRACT

Embodiments herein relate to a method performed by a communication device (10) for handling communication in a communication network comprising at least a first wireless communication network (11) and a second wireless communication network (14), wherein the communication device (10) is served by a first radio network node (13) in the second wireless communication network (14). The communication device (10) performs a preparation signaling, via the first radio network node (13) and transparently through the second wireless communication network (14), to a first network node (12) of the first wireless communication network (11) for preparing the first network node (12) and a
(Continued)

second radio network node (18) in a first radio access network of the first communication network (11) with a pre-configuration for serving the communication device (10), wherein the preparation signaling comprises radio access network data and core network data of the communication device (10).

15 Claims, 29 Drawing Sheets

(58) Field of Classification Search
CPC .......... H04W 36/0066; H04W 36/0005; H04L 65/1003
See application file for complete search history.

(56) References Cited

U.S. PATENT DOCUMENTS

| | | | |
|---|---|---|---|
| 2009/0016300 A1* | 1/2009 | Ahmavaara | H04W 36/0072 370/331 |
| 2010/0054207 A1 | 3/2010 | Gupta et al. | |
| 2010/0272049 A1* | 10/2010 | Tung | H04W 88/06 370/329 |
| 2013/0121308 A1* | 5/2013 | Dhingra | H04W 36/08 370/331 |
| 2014/0287757 A1* | 9/2014 | Borg | H04W 8/26 455/436 |
| 2014/0341041 A1* | 11/2014 | Velev | H04W 4/70 370/236 |
| 2016/0198364 A1* | 7/2016 | Schwarzbauer | H04W 28/08 370/331 |
| 2016/0255543 A1* | 9/2016 | Yadhav | H04L 67/148 370/331 |
| 2019/0014519 A1* | 1/2019 | Brown | H04W 76/16 |

OTHER PUBLICATIONS

"3GPP TS 23.501 V1.4.0", 3rd Generation Partnership Project; Technical Specification Group Services and System Aspects; System Architecture for the 5G System; Stage 2 (Release 15), Sep. 2017, pp. 1-151.

"CBRS Network Services Technical Report (TR)", CBRS Alliance; Technical Working Group: Network Services Task Group; CBRS Network Services Technical Report; NSTG-16-017_TR_Rev 7, Mar. 14, 2017, pp. 1-51.

"Further Discussion on Transfer of large size UE EUTRA capabilities", 3GPP TSG-RAN WG2 #83; Tdoc R2-132800; Barcelona, Spain, Aug. 19-23, 2013, pp. 1-2.

"MFA TS MF .202 V1.0.4", MulteFire Alliance, Architecture for Neutral Host Network Access Mode Stage 2 (Release 1), Sep. 2017, pp. 1-59.

"UE capability for modified MPR behavior", 3GPP TSG-RAN WG2 Meeting #85; R2-140553; Prague, Czech Republic, Feb. 10-14, 2014, pp. 1-4.

"3GPP TS 36.300 V14.4.0"; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Sep. 2017, pp. 1-329.

"TS 36.413 V14.4.0"; 3rd Generation Partnership Project; Technical Specification Group Radio Access Network; Evolved Universal Terrestrial Radio Access Network (E-UTRAN); S1 Application Protocol (S1AP) (Release 14), Sep. 2017, pp. 1-353.

"3GPP TS 36.423 V14.0.0"; 3rd Generation Partnership Project; Technical Specification Group Radio Access Network; Evolved Universal Terrestrial Radio Access Network (E-UTRAN); X2 application protocol (X2AP) (Release 14), (Sep. 2016), Sep. 2016, pp. 1-239.

"3GPP TS 23.401 V15.1.0"; 3rd Generation Partnership Project; Technical Specification Group Services and System Aspects; General Packet Radio Service (GPRS) enhancements for Evolved Universal Terrestrial Radio Access Network (E-UTRAN) access (Release 15), Sep. 2017, pp. 1-397.

"3GPP TS 36.331 V15.1.0", 3rd Generation Partnership Project; Technical Specification Group Radio Access Network; Evolved Universal Terrestrial Radio Access (E-UTRA); Radio Resource Control (RRC); Protocol specification (Release 15), Mar. 2018, pp. 1-786.

* cited by examiner

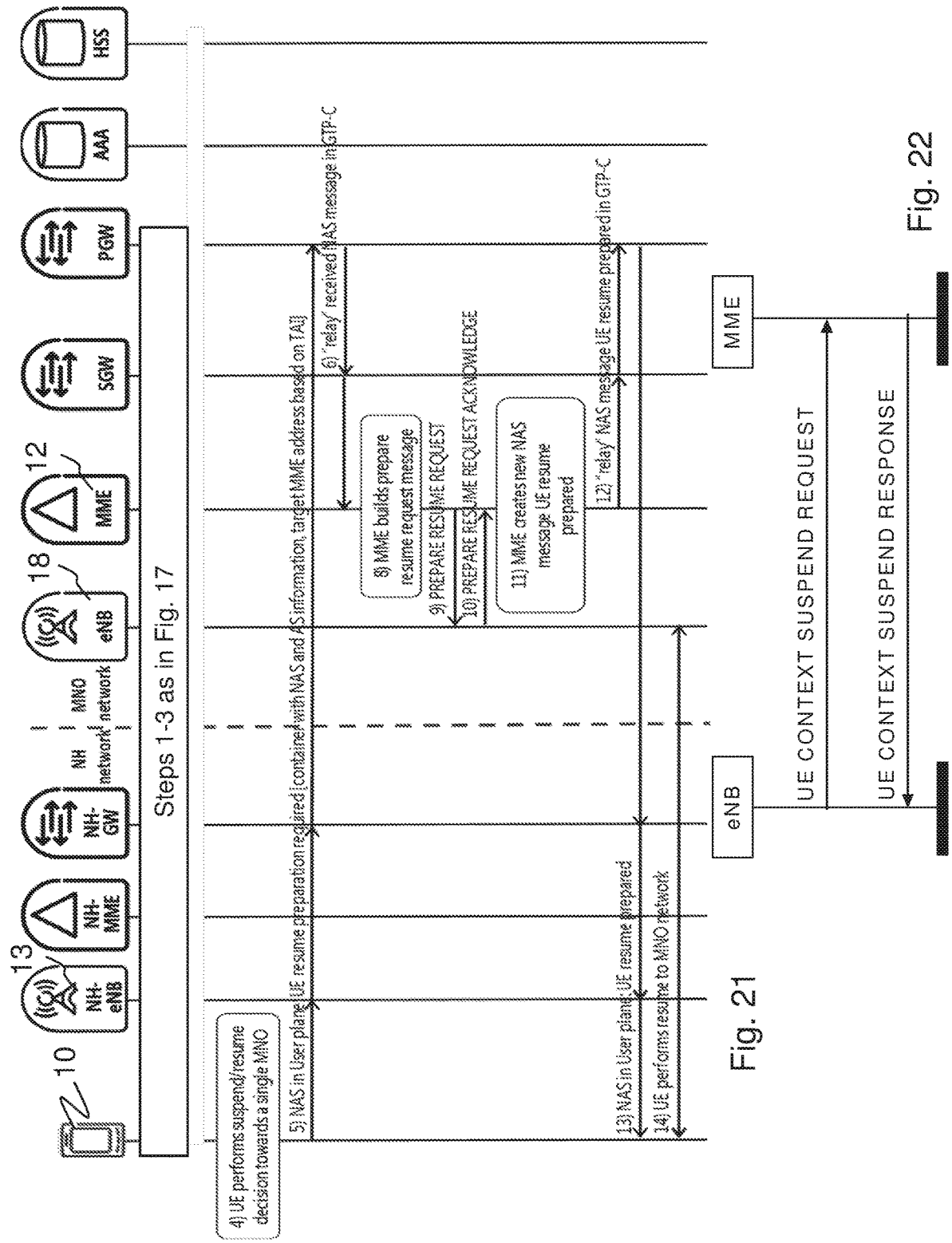

COMMUNICATION DEVICE, NETWORK NODE, RADIO NETWORK NODE AND METHODS PERFORMED THEREIN FOR HANDLING COMMUNICATION IN A COMMUNICATION NETWORK

TECHNICAL FIELD

Embodiments herein relate to a communication device, a first network node and a second radio network node and methods performed therein for communication. Furthermore, a computer program and a computer readable storage medium are also provided herein. In particular, embodiments herein relate to handling communication in a communication network.

BACKGROUND

In a typical communication network, communication devices, also known as wireless devices or user equipments (UEs), communicate via a Radio Access Network (RAN) to one or more core networks for example for using a Mobile broadband service. Mobile Broadband services are demanded in more and more locations, also indoors. Enterprises are increasingly operating also out of the enterprise premises, requiring the same connectivity and services inside and outside the office. There is a trend of Bring-your-own-device (BYOD), implying that enterprise personnel e.g. employees, consultants, etc., bring their own communication devices, usually associated with or even locked to a specific operator. The enterprise will thus often need to support several operators. A simple way is that all operators provide sufficiently good indoor coverage, which usually implies indoor network for all operators. However, this option is not cost efficient, due to amount of radio equipment needed to cover many frequency bands. From a cost perspective it is preferred to use a single radio chain for all communication devices, i.e. one spectrum band.

There is thus a cost reduction potential by designing shared wireless communication network indoors. Current regulations and business logic imply that existing outdoor wireless communication networks will remain separate in most cases. One possible scenario is the following, where there are two wireless communication networks A and B with different network identities, in current cellular systems denoted Public Land Mobile Network (PLMN), mainly outdoors, and an e.g. indoor PLMN X, which PLMN A and PLMN B users should be able to use while positioned indoors. Thus, there are multiple outdoor systems PLMN A and PLMN B operated by separate operators, and islands of local systems PLMN X operated by one of operators PLMN A and PLMN B, or by a separate company, see FIG. 1. The wireless communication networks may use licensed spectrum, unlicensed spectrum, or a mix of the two, or, indeed, hybrid spectrum licensing regimes. The above scenario can be seen as a roaming case, i.e. a communication device will move between PLMN A/B outdoors and PLMN x indoors.

Another possible scenario is that the indoor wireless communication network (re-) uses the same PLMN A and/or PLMN B, but on a different spectrum than those used by the outdoor parts of PLMN A/B. The indoor wireless communication network is expected to be managed by another organization than those of the Mobile Network Operators (MNO) and with minimal planning coordination between indoor and outdoor parts. This scenario can be implemented in different ways, typically a Multi Operator Core Network (MOON) configuration, where each cell or service area supports both PLMN A and PLMN B, or a mobile operator radio access network configuration, where some cells indicate PLMN A and other cells indicate PLMN B. In this scenario the "indoor network" is a RAN part of the overall PLMN A/B network.

One implication of the separate management of wireless communication networks, such as indoor and outdoor networks, is that the normal tight coordination of adjacent wireless communication networks is not practical or efficient, e.g. a long transfer time when moving between wireless communication networks also referred to as mobility transfer time, resulting in a limited or reduced performance of the communication network.

SUMMARY

An object of embodiments herein is to provide a mechanism for improving the performance of a communication network allowing communication devices to move between different wireless communication networks of the communication network in an efficient manner.

According to an aspect the object is achieved by providing a method performed by a communication device for handling communication in a communication network comprising at least a first wireless communication network and a second wireless communication network, which communication device is served by a first radio network node in the second wireless communication network. The communication device performs a preparation signaling, via the first radio network node and transparently through the second wireless communication network, with a first network node of the first wireless communication network for preparing the first network node and a second radio network node in a first radio access network of the first communication network with a pre-configuration for serving the communication device, which the preparation signaling comprises radio access network data and core network data of the communication device.

According to another aspect the object is achieved by providing a method performed by a first network node, such as a Mobility Management Entity (MME) or a gateway, for handling communication of a communication device in a communication network comprising at least a first wireless communication network and a second wireless communication network. The first network node is comprised in the first wireless communication network and the communication device is served by a first radio network node comprised in the second wireless communication network. The first network node performs a preparation signaling with the communication device, via the first radio network node and transparently through the second wireless communication network, for preparing the first network node and a second radio network node in a first radio access network of the first communication network with a pre-configuration for serving the communication device. The preparation signalling, from the communication device, comprises radio access network data and core network data of the communication device.

According to yet another aspect the object is achieved by providing a method performed by a second radio network node for handling communication of a communication device in a communication network comprising at least a first wireless communication network and a second wireless communication network. The second radio network node is comprised in a first radio access network in the first wireless communication network and the communication device initiates an access to a cell of the second radio network node. The second radio network node initiates an abbreviated access process, for the communication device, to the first radio access network in the first wireless communication network. The abbreviated access process comprises receiving, from the communication device, a preparation indication indicating the abbreviated access process, the preparation indication referencing a communication device context for the communication device in the first radio access network of the first wireless communication network. The communication device context is configured from a preparation signaling from the communication device in the second wireless communication network via a first radio network node in the second wireless communication network and transparently through the second wireless communication network. The preparation signaling comprises providing the preparation indication to the communication device. The second radio network node retrieves information related to the communication device context for serving the communication device for the initiated abbreviated access process using the preparation indication.

It is furthermore provided herein a computer program comprising instructions, which, when executed on at least one processor, cause the at least one processor to carry out any of the methods above, as performed by the first network node, the second radio network node, or the communication device. It is additionally provided herein a computer-readable storage medium, having stored thereon a computer program comprising instructions which, when executed on at least one processor, cause the at least one processor to carry out the method according to any of the methods above, as performed by the first network node, the second radio network node, or the communication device.

According to still another aspect the object is achieved by providing a communication device communication device for handling communication in a communication network comprising at least a first wireless communication network and a second wireless communication network. The communication device is configured to operate in the second wireless communication network comprising a first radio network node. The communication device is configured to perform a preparation signaling, via the first radio network node and transparently through the second wireless communication network, with a first network node of the first wireless communication network for preparing the first network node and a second radio network node in a first radio access network of the first communication network with a pre-configuration for serving the communication device. The preparation signaling comprises radio access network data and core network data of the communication device.

According to yet still another aspect the object is achieved by providing a first network node for handling communication of a communication device in a communication network comprising at least a first wireless communication network and a second wireless communication network. The first network node is configured to operate in the first wireless communication network and a first radio network node comprised in the second wireless communication network is configured to serve the communication device. The first network node is configured to perform a preparation signaling with the communication device, via the first radio network node and transparently through the second wireless communication network, for preparing the first network node and a second radio network node in a first radio access network of the first communication network with a pre-configuration for serving the communication device. The preparation signalling, from the communication device, comprises radio access network data and core network data of the communication device.

According to another aspect the object is achieved by providing a second radio network node for handling communication of a communication device in a communication network comprising at least a first wireless communication network and a second wireless communication network. The second radio network node is configured to operate in a first radio access network in the first wireless communication network. Furthermore, the second radio network node is configured to initiate, upon the communication device initiating an access to a cell of the second radio network node, an abbreviated access process, for the communication device, to the first radio access network in the first wireless communication network. The abbreviated access process comprises: receiving, from the communication device, a preparation indication indicating the abbreviated access process. The preparation indication references a communication device context for the communication device in the first radio access network of the first wireless communication network. The communication device context is configured from a preparation signaling from the communication device in the second wireless communication network via a first radio network node in the second wireless communication network and transparently through the second wireless communication network. The preparation signaling comprises providing the preparation indication to the communication device. The second radio network node further retrieves information related to the communication device context for serving the communication device for the initiated abbreviated access process using the preparation indication.

Embodiments herein minimizes mobility transfer time for the communication device between a current wireless communication network and at least one surrounding wireless communication network, without the need for business nor technical coordination between the network operators. Thus, embodiments herein allow the communication device to find and move between wireless communication networks when moving in and out of e.g. buildings or other "islands" of shared wireless communication networks in an efficient manner. This results in an improved performance of the communication network.

BRIEF DESCRIPTION OF THE DRAWINGS

Embodiments will now be described in more detail in relation to the enclosed drawings, in which:

FIG. 21 is a signalling scheme according to some embodiments herein;

FIG. 22 is a signalling scheme according to some embodiments herein;

DETAILED DESCRIPTION

Figure 1:
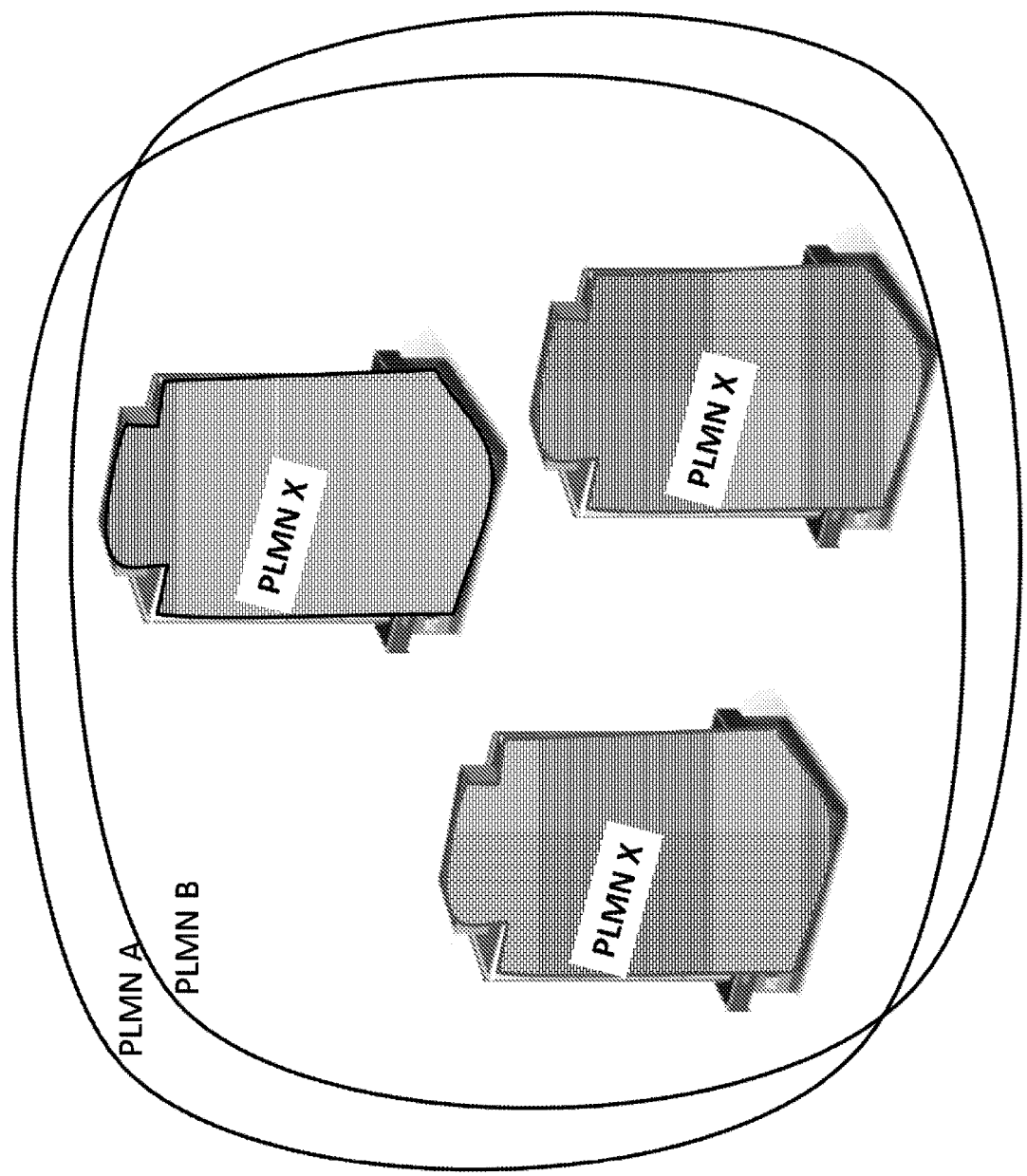
FIG. 1 is a schematic overview depicting a communication network comprising a multiple of wireless communication networks.

Current solutions for inter-network mobility, i.e. moving between wireless communication networks of different radio access technologies (RAT) and/or operators e.g. between wireless communication networks of different operators using same or different RATs, have several shortcomings mainly in the areas of interactions and dependencies between operators, mobility performance and communication device-impact (single radio vs dual radio support).

Operators want to minimize interaction and dependencies between each other, e.g. to simplify the work and to reduce leakage of information about the wireless communication network and its subscribers to other operators. The MOCN, Gateway Core Network (GWCN) and roaming solutions contain the need for such interactions and dependencies. For example, they require inter-RAN level agreements and coordination of RAN parameters such as neighbor cell lists. Embodiments herein are about improving connected mode mobility between different types of wireless communication networks in a way that optimum mobility performance can be achieved while still keeping minimal level of cross-network configuration and dependencies between the different networks. Embodiments herein enable a communication device to find and move between networks when moving in and out of the buildings (or other "islands" of shared networks).

3GPP cellular networks allow several ways for cooperation between different operators, without the need for separate frequency bands per operator. They can broadly be divided into the following classes:

Roaming
Gateway Core Network (GWCN)
Multi-operator Core Network (MOCN)

It can be noted that the number of situations of inter-network mobility situations will likely increase, as the result of new licensing schemes like Federal Communications Commission's (FCC) Citizens Broadband Radio Service (CBRS), which is also evaluated by the Office of Communications (Ofcom) in UK. One objective of these initiatives is to allow smaller enterprises to set up local networks per location. FCC will allow enterprises to acquire licenses in approximately 74000 census tracts. In a particular area there can thus exist "normal cellular systems" outdoors on classical licensed spectrum plus the same cellular systems on some 3.5 GHz carriers plus other smaller enterprise networks on other (or adjacent) 3.5 GHz carriers. The enterprise systems may architecturally be designed as 3GPP networks, with e.g. roaming interfaces, such as interfaces S6b, S10, or even interfaces allowing handover, such as interface S8. But the enterprise wireless communication networks may also be designed in other ways with no interface at all to the regular cellular systems.

In general, geographically local spectrum licensing regimes, with dedicated spectrum devoted to various kinds of local systems may increase, and where the local system is still expected to provide service to in-roaming devices normally belonging to wide-area systems. One can envision a scenario in which the shared wireless communication network islands (PLMN Xs) are very common. One extreme form of this situation, which is relevant for the embodiments herein, is where the shared network islands together form the entire communication network, i.e. the roaming occurs between such islands and all networks resources are shared.

The scenarios above focus on mobile broadband services, but in the networked society, all devices with mobility, such as Internet of Things (loT) sensor devices, are subject to the same challenges. In fact, the trend of spectrum licensing for dedicated service types such as Intelligent Traffic Systems, National Security & Public Safety service can result in geographically local systems, with roaming needs to other systems and frequency bands when a communication device moves out of a local area to a more general system where basic connectivity is still wanted.

The scenarios above focus on indoor system environments. Of course, any shared wireless communication network island (PLMN X) can occur and be a target for roaming. For example, outdoor arenas and other venues, industry production plants or storage facilities with outdoor parts, campuses, open mines, etc. The described indoor environment case should only be seen as one example of a confined environment where a shared network island is present.

Figure 2:
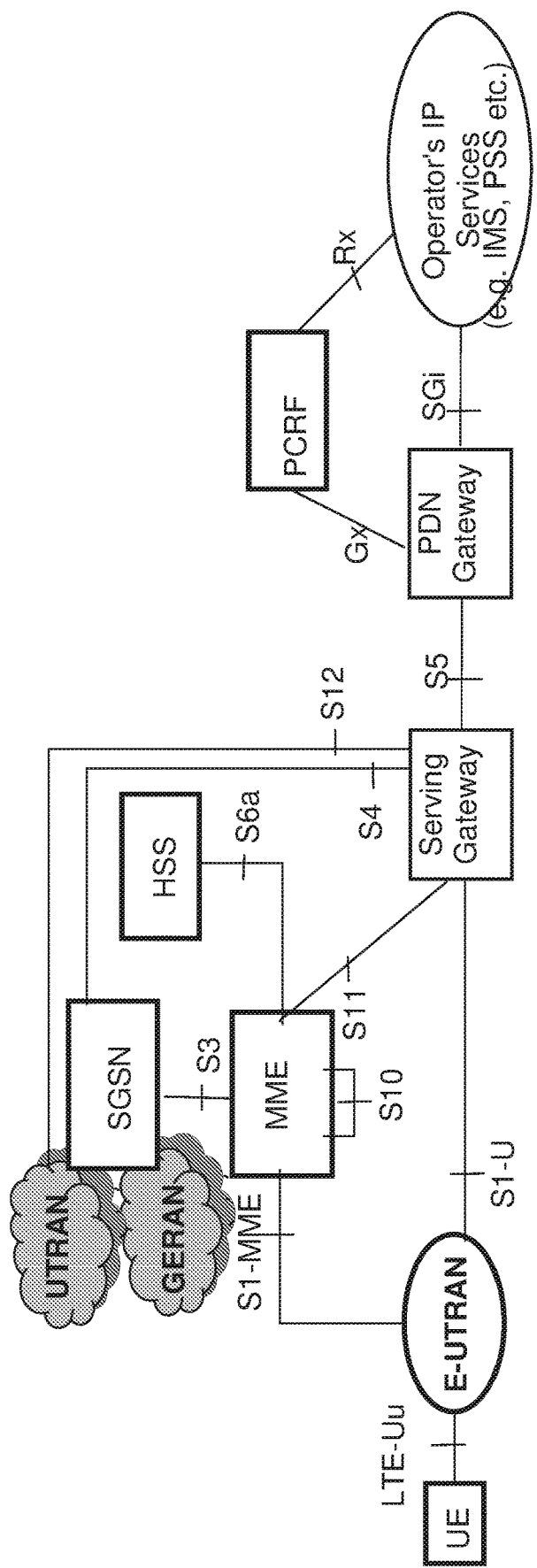
FIG. 2 is a schematic overview depicting a communication network.

FIG. 2 is an overview of the EPC architecture for one network. This architecture is defined in 3GPP TS 23.401 v. 15.1.0. See that specification for a definition of the Packet Data Network (PDN) Gateway (PGW) or (PDN-GW), Serving Gateway (SGW), Policy and Charging Rule Function (PCRF), Mobility Management Entity (MME), Home Subscriber Server (HSS) and Serving GPRS Support Node (SGSN) to the GSM EDGE Radio Access Network (GERAN) and UMTS Terrestrial Radio Access Network (UTRAN). The LTE radio access, E-UTRAN, consists of one or more eNBs. The picture shows the architecture for 3GPP accesses. In those accesses the radio interface is specified by 3GPP, e.g. LTE.

Figure 3:
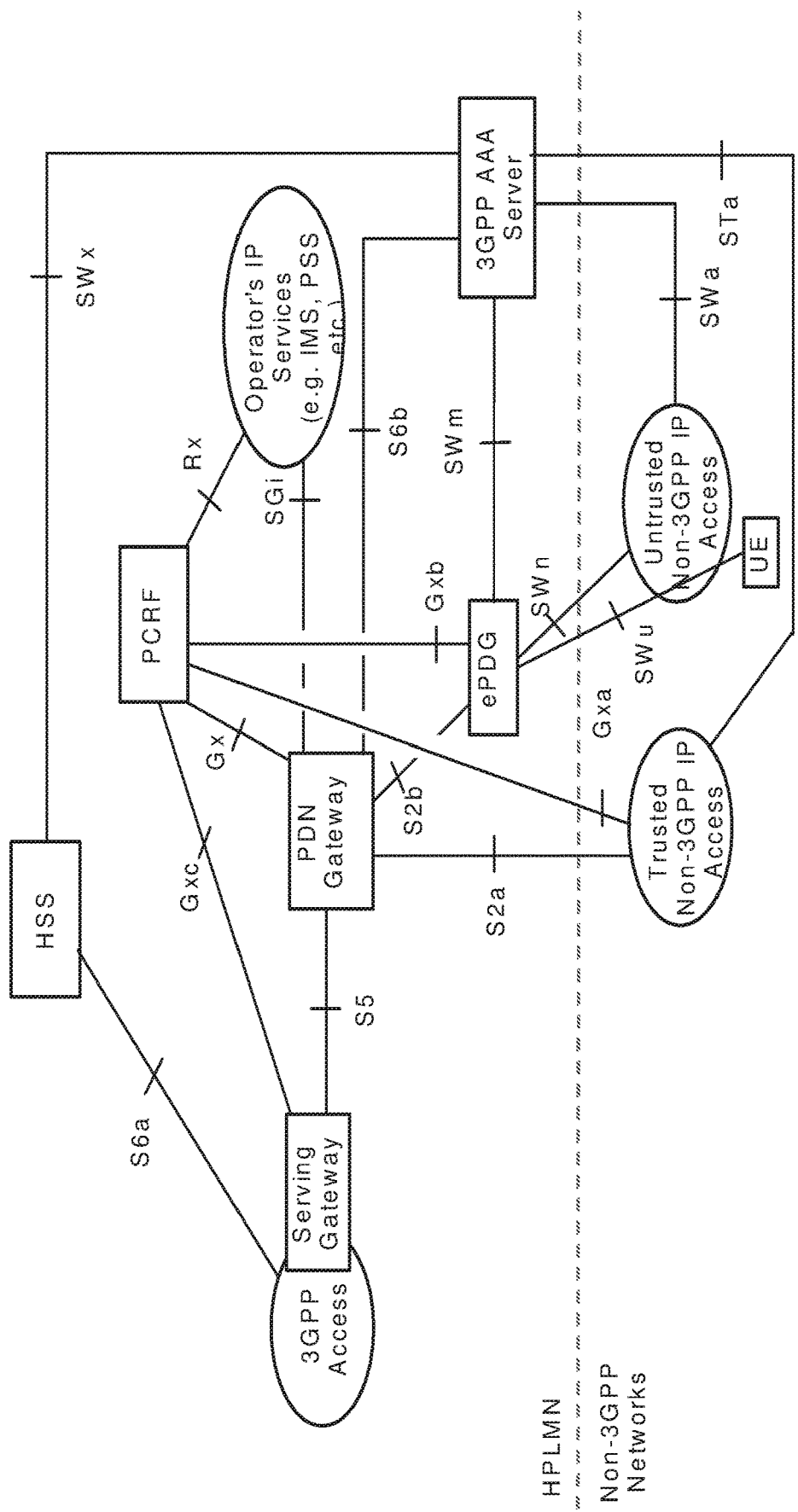
FIG. 3 is a schematic overview depicting a communication network.

FIG. 3 shows an extension to the EPC architecture in order to allow also non-3GPP accesses. In such access the radio interface is not specified by 3GPP, e.g. Wireless Local Area Network (WLAN). See 3GPP TS 23.402 v. 15.1.0. Also in this case only one 3GPP network is shown. Authentication, authorization, and accounting (AAA) server is comprised in the 3GPP network and also an evolved packet data gateway (ePDG).

A non-3GPP access may be trusted or untrusted. The exact definition of trusted or untrusted is given in the 3GPP specifications. Simplified, one can say that a trusted access is managed by an operator, e.g. an operator hotspot, whereas an untrusted access is not managed by the operator, e.g. a WiFi access point at home. In a non-3GPP access a security gateway called evolved packet data gateway (ePDG) is used between the untrusted domain and the operator's network. The communication device sets up a secure tunnel to the ePDG, and there is the S2b interface between ePDG and PGW. A trusted 3GPP access hosts a gateway, Trusted Wireless Access Gateway (TWAG) see TS 23.402 v15.1.0 section 16. There is a point-to-point interface between communication device and TWAG, and the S2a interface between TWAG and PGW.

Solutions based on the S2a interface are now also being discussed for new solutions, for example for new solutions being defined in both MuLTEfire Alliance and CBRS Alliance (see below). MuLTEfire is a form of LTE deployment in unlicensed frequency bands. On a high level these solutions are about using the S2a interface also for LTE access and derivatives of LTE. The currently defined solution for S2a interface is based on Dual Radio on the communication device side i.e. that the communication device is capable to operate simultaneously in both Wi-Fi and LTE/EPC networks, i.e. these solutions are not seen as feasible for Single-Radio communication devices. The Dual Radio on communication device-side allows "make-before-break" type of operation. In addition, these solutions are also about giving the communication device access to a single wireless communication network i.e. even communication over Wi-Fi networks is integrated towards the user plane part of EPC also serving the current serving wireless communication network of the communication device.

Embodiments herein are described in the context of improvements and additions to e.g. the S2a interface based solutions and to also make these feasible for single radio communication devices, and especially to achieve optimal mobility performance. Therefore the current S2a interface based solution and mobility mechanisms are described briefly in the following, as stated above, more information is found in section 16 of 3GPP TS 23.402 v15.1.0.

Figure 4:
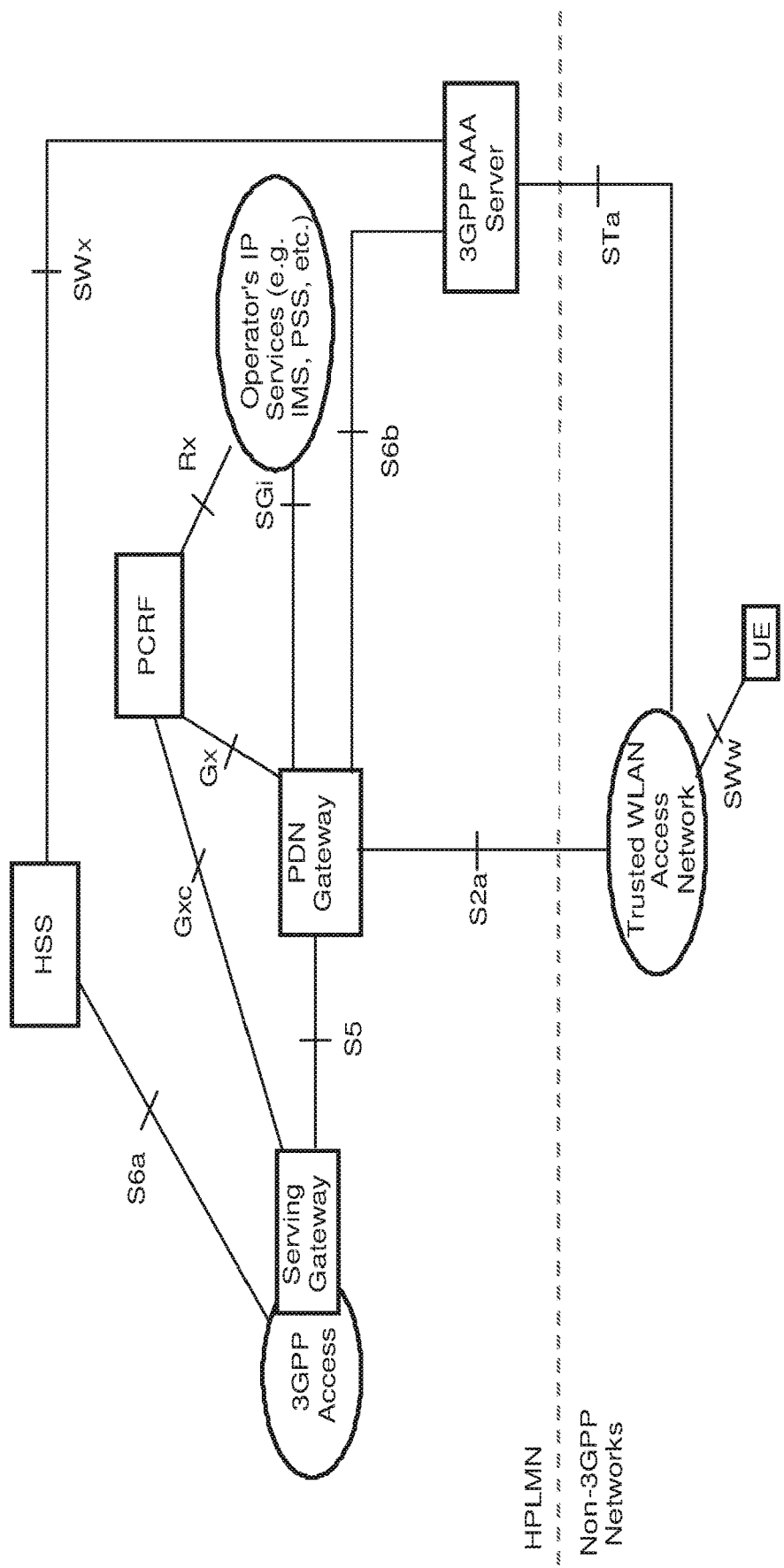
FIG. 4 is a schematic overview depicting a communication network.

The architecture for S2a interface based solution is shown in FIG. 4 (the Non-Roaming case is shown). Trusted WLAN access is integrated towards 3GPP Authentication, authorization, and accounting (AAA) Server and Home Subscriber Server (HSS) for authentication based on STa and SWx interfaces. The Trusted WLAN access network is also integrated to the PDN GW based on the S2a interface. It is also worth noting that MME is not shown in the figure as it doesn't play any significant role in this case. The MME is in the "3GPP Access" circle where the S6a interface from the HSS is terminated.

Figure 5:
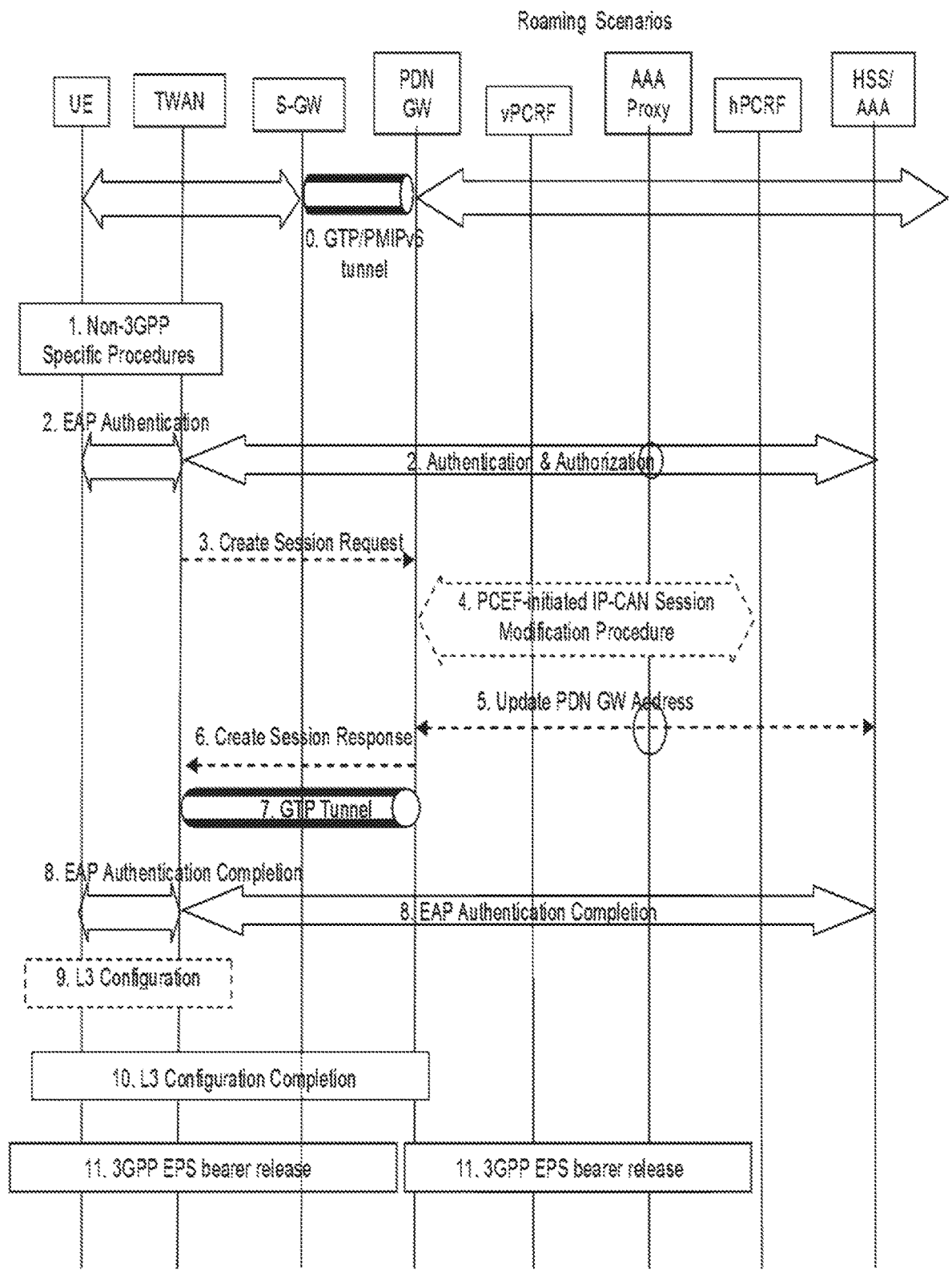
FIG. 5 is a schematic flowchart depicting a roaming scenario in a communication network.
Figure 16:
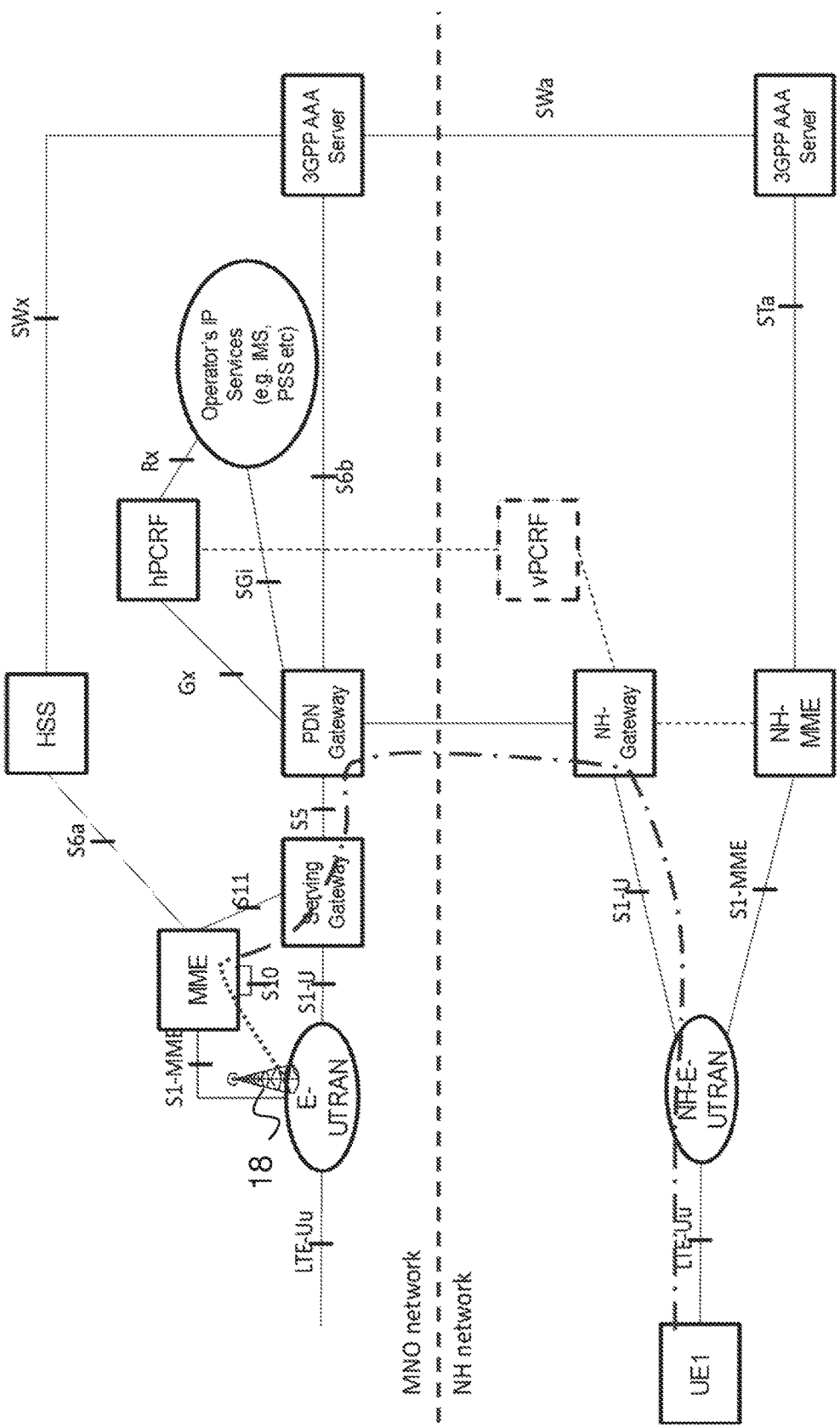
FIG. 16 is a schematic overview depicting a communication network according to embodiments herein.

FIG. 5 (taken from 23.402 v15.1.0. FIG. 16.10.1.1-1) shows the signaling flow for Handover from 3GPP access to WLAN on GPRS-Tunnel protocol (GTP) S2a. As described above, this signaling flow is based on Dual Radio communication device and is visible in the way that the communication device remains connected to the 3GPP access while accessing WLAN. FIG. 5 also shows that there is no network side support for any handover related procedures.

Figure 6:
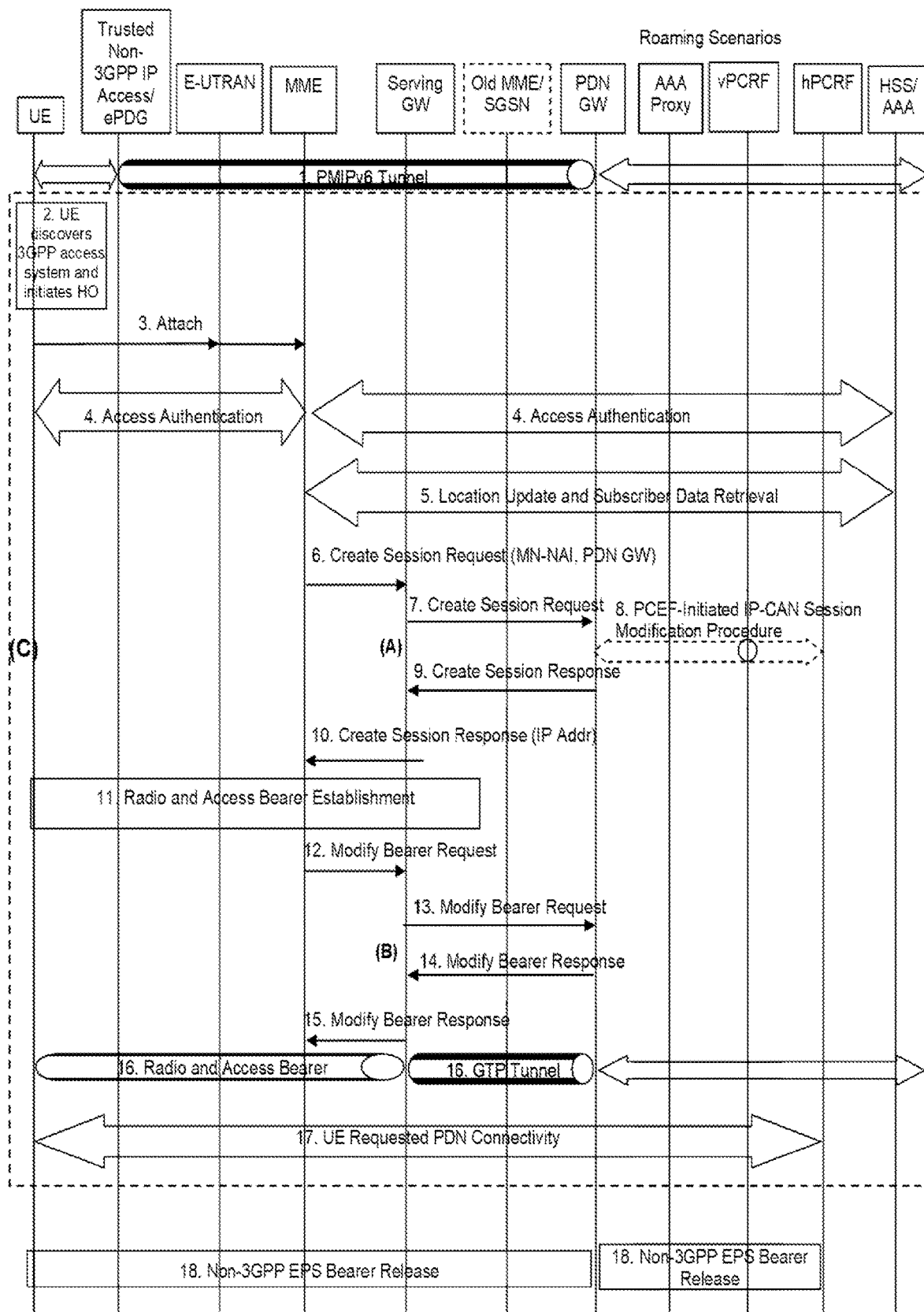
FIG. 6 is a schematic flowchart depicting a roaming scenario in a communication network.

FIG. 6 (taken from 23.402 v15.1.0, clause 16.11, which points at FIG. 8.2.1.1-1 for the case of GTP-based S5/S8 for E-UTRAN) shows the signaling flow for Handover mode from WLAN on GTP S2a to 3GPP access. As described above, this signaling flow is based on Dual Radio communication device and is visible in the way that the communication device remains connected to the WLAN access while accessing 3GPP. The communication device performs an Attach towards the 3GPP network and indicates a special type of Attach so that IP address preservation may be achieved. The FIG. 6 also shows that there is no network side support for any handover related procedures and that the MME in the 3GPP access is first involved when the communication device performs the Attach. FIG. 6 is a generic signaling flow described in 3GPP TS 23.401 v. 15.1.0 and therefore not all the details shown are exactly correct for the S2a interface based solution (see section 16.11 in 3GPP TS 23.401 for the differences).

In both MuLTEfire Alliance and CBRS Alliance work is ongoing to create another form of network sharing by using the S2a, and possibly S2b, interface based non-3GPP architecture.

Figure 7:
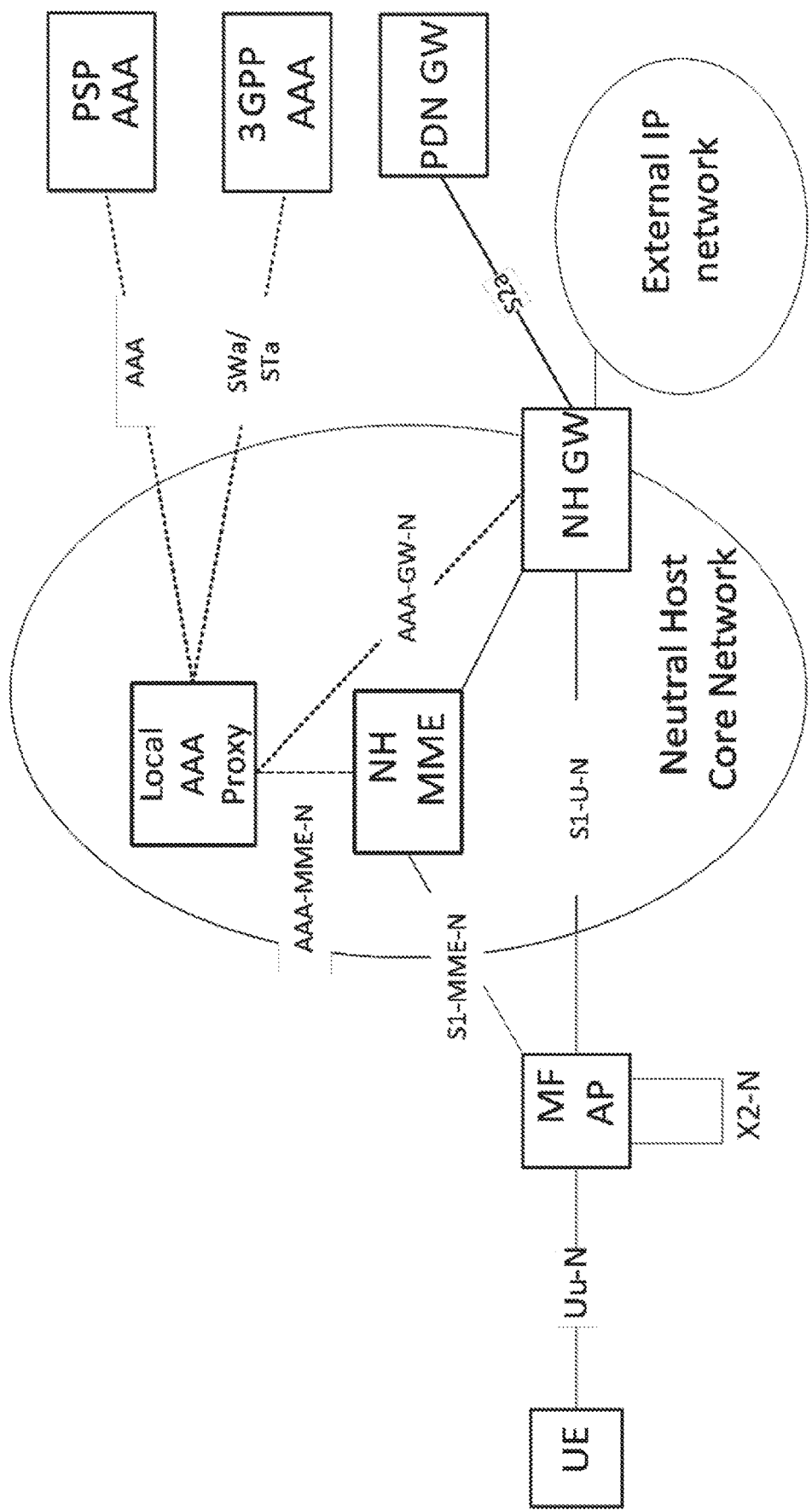
FIG. 7 is a schematic overview depicting a communication network.

FIG. 7 shows MuLTEfire Neutral Host Network Architecture, when using S2a interface towards the MNO PDN-GW and SWa/STa interfaces for authentication towards 3GPP AAA by the MNO (FIG. 5.2.1 in MFA TS MF.202 V1.0.1, Architecture for Neutral Host Network Access Mode, Stage 2 (Release 1)).

Figure 8:
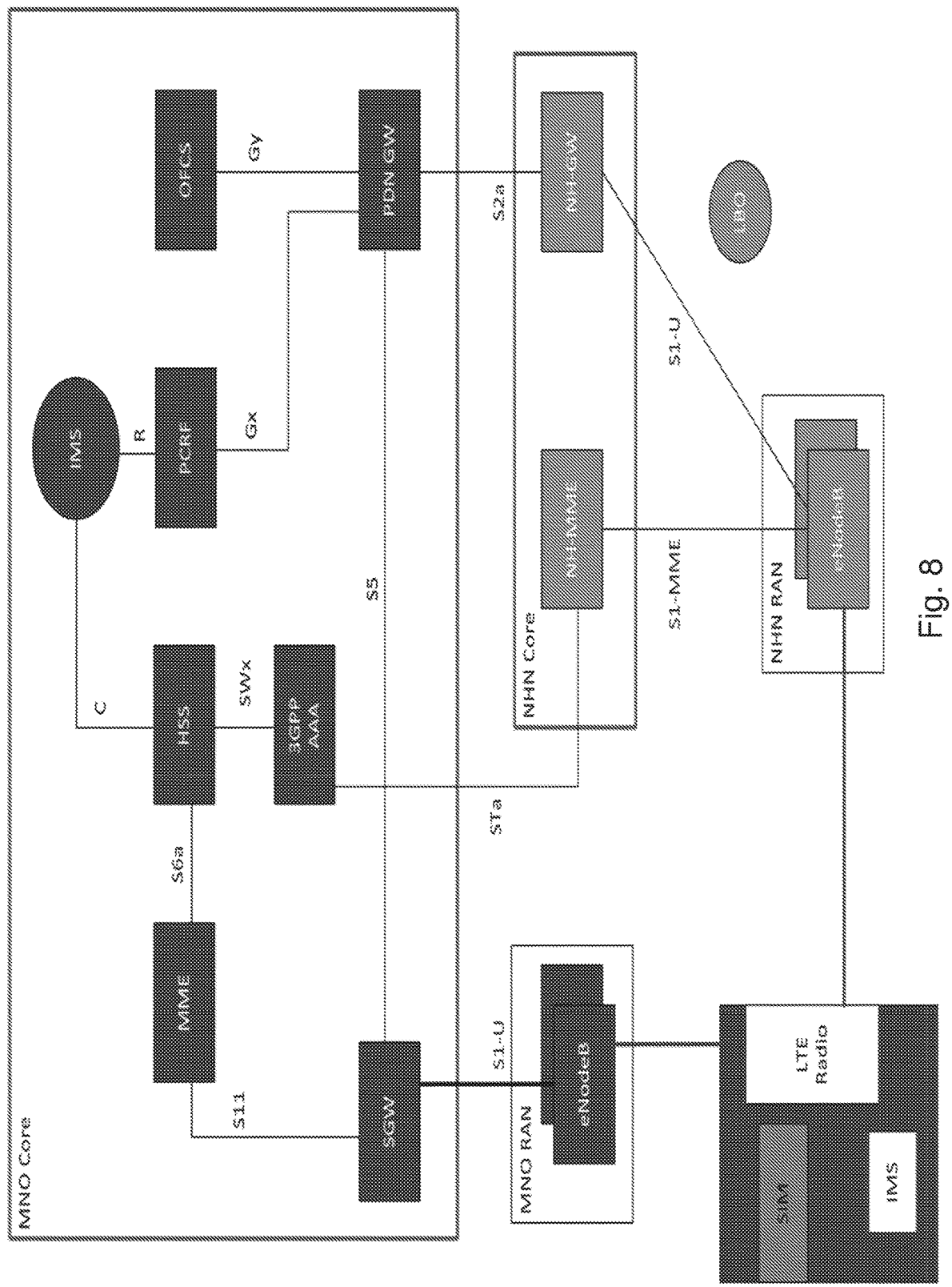
FIG. 8 is a schematic overview depicting a communication network comprising multiple wireless communication networks.

FIG. 8 shows CBRS Alliance Neutral Host Network Reference Architecture when using S2a interface towards the MNO PDN-GW and STa interface for authentication towards 3GPP AAA by the MNO (FIG. 6-1 in CBRS Network Services Technical Report, Version V0.7).

MulteFire mobility is divided into cases: (i) intra-MNO mobility, (ii) intra-Neutral Host Network (NHN) mobility and (iii) inter MNO⇔NHN mobility. Cases (i) and (ii) use regular 3GPP-standardized intra-LTE procedures. Case (iii) is directly modelled after WLAN mobility in 3GPP 23.402, using either Trusted or Untrusted WLAN, i.e. S2a- or S2b-interface to MNO PDN-GW, replacing the WLAN with MulteFire RAN. An offline charging system (OFCS) node and an IP Multimedia Subsystem (IMS) node are also shown.

The case of NHN→MNO mobility specification point directly to the diagram in FIG. 6 i.e. Handover mode from WLAN on GTP S2a to 3GPP access as defined in 3GPP TS 23.402 v. 15.1.0.

CBRS Alliance has a similar solution, but with focus on single-radio solutions and only using S2a interface to MNO PDN-GW.

Current solutions for inter-network mobility have several shortcomings, mainly in the areas of interactions and dependencies needed between operators, mobility performance and UE-impact (single radio vs dual radio support).

Dual/multi radio means that the communication device can simultaneously operate several radios and connections and it can thus communicate with multiple wireless communication networks simultaneously. This largely eliminates the need for inter-network mobility, since the communication device is already connected to the wireless communication networks needed. A new issue is rather how to allocate services per wireless communication network. The main drawback is that multi-radio operation is often not realistic. If radio channels are too close to each other, have frequency relations creating spurious interference, etc. then dual/multi radio operation can be disabled. The nature of different wireless communication networks is that they are not co-planned, which makes problem cases rather frequent, especially in cellular networks where wireless communication networks often use adjacent parts of the same frequency bands.

Hence, 3GPP mobility is based on the classical single radio communication device architecture, and to be able to achieve good inter-network mobility performance while keeping single radio communication devices is one objective of embodiments herein.

Dual radio can, in some cases, be "simulated" by the single radio quickly alternating between the radio connections, ideally making both connections operational. This is the method used for 3GPP "In-Device Co-existence" (see 3GPP TS 36.331 v. 15.1.0). This may work rather well for distinctly different radio technologies, e.g. LTE+802.11 or LTE+Bluetooth. For similar technologies, e.g. LTE TDD+ LTE TDD there are cases when such toggling, i.e. alternating between the radio connections, is infeasible.

Operators want to minimize interaction and dependencies between each other, e.g. to simplify the work and to reduce leakage of information about the network and its subscribers to other operators. The MOON and GWCN solutions, described above, contain the need for such interactions and dependencies. For example, these solutions require inter-RAN level agreements and coordination of RAN parameters such as neighbor cell lists.

Assuming single radio communication devices, the known roaming solutions result in poor performance when the communication device moves between different 3GPP networks. There are multiple reasons for this poor performance and three examples are described in the following. Firstly, the communication devices prefer to stay in a PLMN until coverage of this network is completely lost. Secondly, the communication device does not normally know where in the frequency/channel domain to search for a new PLMN, and therefore the search for a new PLMN can take several minutes. Thirdly, once the communication device has detected a new PLMN, it must start by performing a complete Attach procedure including authentication (as Mobility Management signaling) and additional Session Management signaling to establish of user plane connectivity in the core and radio networks.

Similarly (again assuming single radio communication devices), known loose integration methods for non-3GPP accesses, described above, have corresponding shortcomings in terms of the time it takes for the target network to establish connectivity once the communication devices appears in the target network, which leads to long interruption times for the user. These shortcomings are inherited if the methods are brought into standardization bodies also for mobility between 3GPP networks, as presently proposed (see above).

Figure 9:
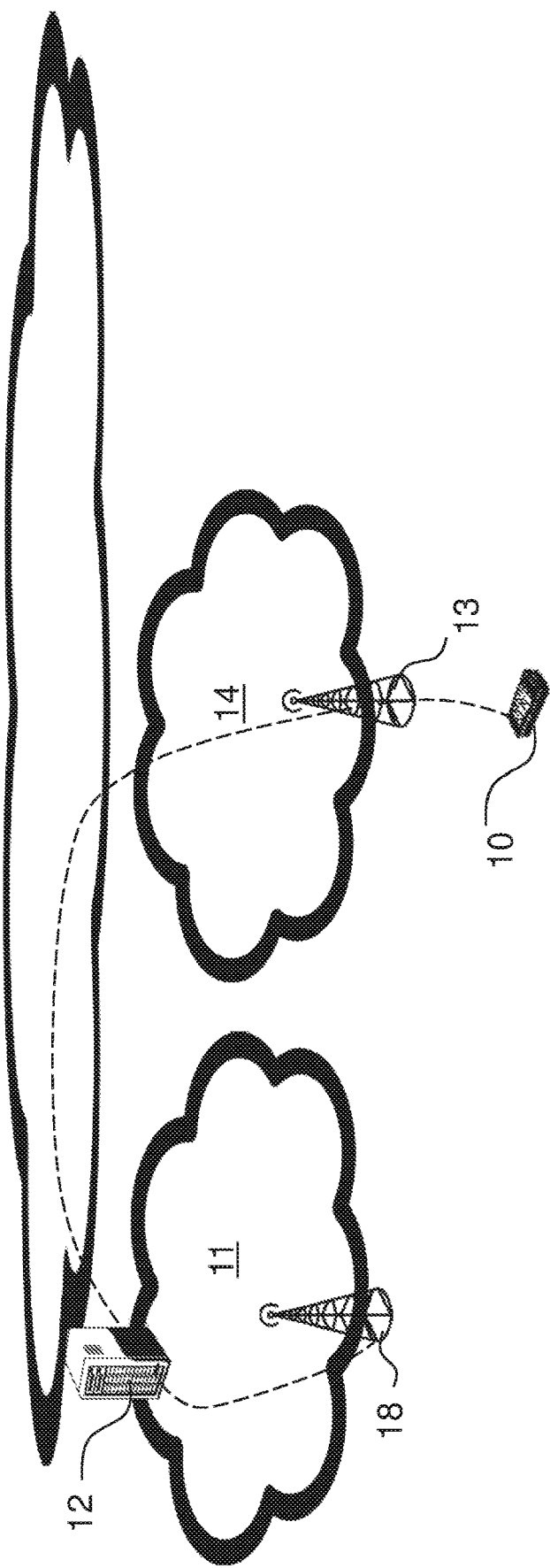
FIG. 9 is a schematic overview depicting a communication network according to embodiments herein.

Embodiments herein relate to communication networks in general. FIG. 9 is a schematic overview depicting a communication network according to embodiments herein. The communication network may comprise any one type or a combination of wireless communication networks using different technologies, such as New Radio (NR), Wi-Fi, Long Term Evolution (LTE), LTE-Advanced, Fifth Generation (5G), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication networks such as e.g. WCDMA and LTE. Embodiments herein may also be implemented into communication networks according to MuLTEfire Alliance and CBRS Alliance configurations.

A communication device 10 also referred to as wireless device or UE such as a mobile station, a computer, a TV, a non-access point (non-AP) Station (STA), a STA, and/or a wireless terminal communicates within the communication network. It should be understood by the skilled in the art that "communication device" is a non-limiting term which means any terminal, communications terminal, user equipment, or node e.g. smart phone, laptop, mobile phone, sensor, relay, or mobile tablet.

The communication network comprises a first wireless communication network 11, exemplified herein as a first PLMN, serving a geographical area of a first radio access technology (RAT), such as New Radio (NR), LTE, Wi-Fi or similar, and the first wireless communication network 11 comprises a first network node 12 e.g. a core network node such as a serving gateway, a Home subscriber Server (HSS) or a Mobility Management Entity (MME).

The communication device 10 is served by a first radio network node 13, e.g. a radio access node providing radio coverage within a building or a limited area, of a second wireless communication network 14, exemplified herein as a PLMN X. The second wireless communication network 14 may be of a second RAT, such as NR, LTE, Wi-Fi, WiMAX or similar. The first radio network node 13 may be a transmission and reception point e.g. a radio network node such as a WLAN access point or an Access Point Station (AP STA), an access controller, a base station, e.g. a radio base station such as a NodeB, an evolved Node B (eNB, eNode B), gNB, a base transceiver station, a radio remote unit, an Access Point Base Station, a base station router, a transmission arrangement of a radio base station, a stand-alone access point or any other network unit capable of communicating with a communication device within the area served by the first radio network node 13 depending e.g. on the second RAT and terminology used. The first radio network node 13 may be referred to as serving access point and communicates with the communication device 10 with DL transmissions to the communication device 10 and UL transmissions from the communication device 10.

The first wireless communication network 11 may in addition to the first network node 12 comprise a second radio network node 18 providing radio coverage over the geographical area or service area. The second radio network node 18 may be a transmission and reception point e.g. a radio network node such as a Wireless Local Area Network (WLAN) access point or an Access Point Station (AP STA), an access controller, a base station, e.g. a radio base station such as a NodeB, an evolved Node B (eNB, eNode B), gNB, a base transceiver station, a radio remote unit, an Access Point Base Station, a base station router, a transmission arrangement of a radio base station, a stand-alone access point or any other network unit capable of communicating with a communication device within the service area served by the second radio network node 18 depending e.g. on the first radio access technology and terminology used.

Embodiments herein address the above related problems in the prior art and are for the purpose to improve inter-network mobility for communication devices with e.g. a single radio architecture. Embodiments herein comprise a way to minimize mobility execution time between a current wireless communication network and at least one surrounding wireless communication network, with minimal need for business and technical coordination between the network operators. The level of coordination needed depends on the solution and architecture for how different wireless communication networks are connected to each other, ranging from some level of integration (e.g. in the S2a interface based solutions) to no integration at all. RAN-level coordination between networks is not needed in any of the solutions.

The minimization of mobility transfer time is done by the communication device 10 triggering mobility preparation signaling towards a radio access network node in one of the surrounding networks in a container manner, i.e. transparently through the current serving network, e.g. the second wireless communication network 14 in order to prepare and also execute mobility towards one of the surrounding networks e.g. the first wireless communication network. Two embodiments for mobility preparation signaling are described, namely handover preparation signaling and suspend/resume preparation signaling.

Embodiments herein provide a support for mobility between 3GPP networks, and between 3GPP and non-3GPP networks as described in the different embodiments. Embodiments herein are based on the communication device 10 being capable to detect target cells in the surrounding networks while in connected mode in the current network and different embodiments are used for single radio and dual radio communication devices. It should be noted that the target cell detection does not need to be instantaneous, in particular for communication device triggered suspend/resume preparation embodiments. Finally, embodiments are not depending on if same or different access credentials are used towards the current and the surrounding networks.

Embodiments herein also apply when operating in single-radio conditions. Single-radio conditions mean conditions when separate simultaneous radio paths in the communication device are not feasible, e.g. since the communication device comprises a single radio and/or unfortunate spacing of channels, creating intermodulation products that disable the radio parts to operate simultaneously.

It should be noted that the second wireless communication network 14 may be an indoor network and the first wireless communication network 11 may be an outdoor network and embodiments herein focus on indoor system environments. However, any shared wireless communication network island can occur and be a target for mobility or roaming. For example, outdoor arenas and other venues, industry production plants or storage facilities with outdoor parts, campuses, open mines, etc. The described indoor environment case should only be seen as one example of a confined environment where a shared network island is present.

Figure 10:
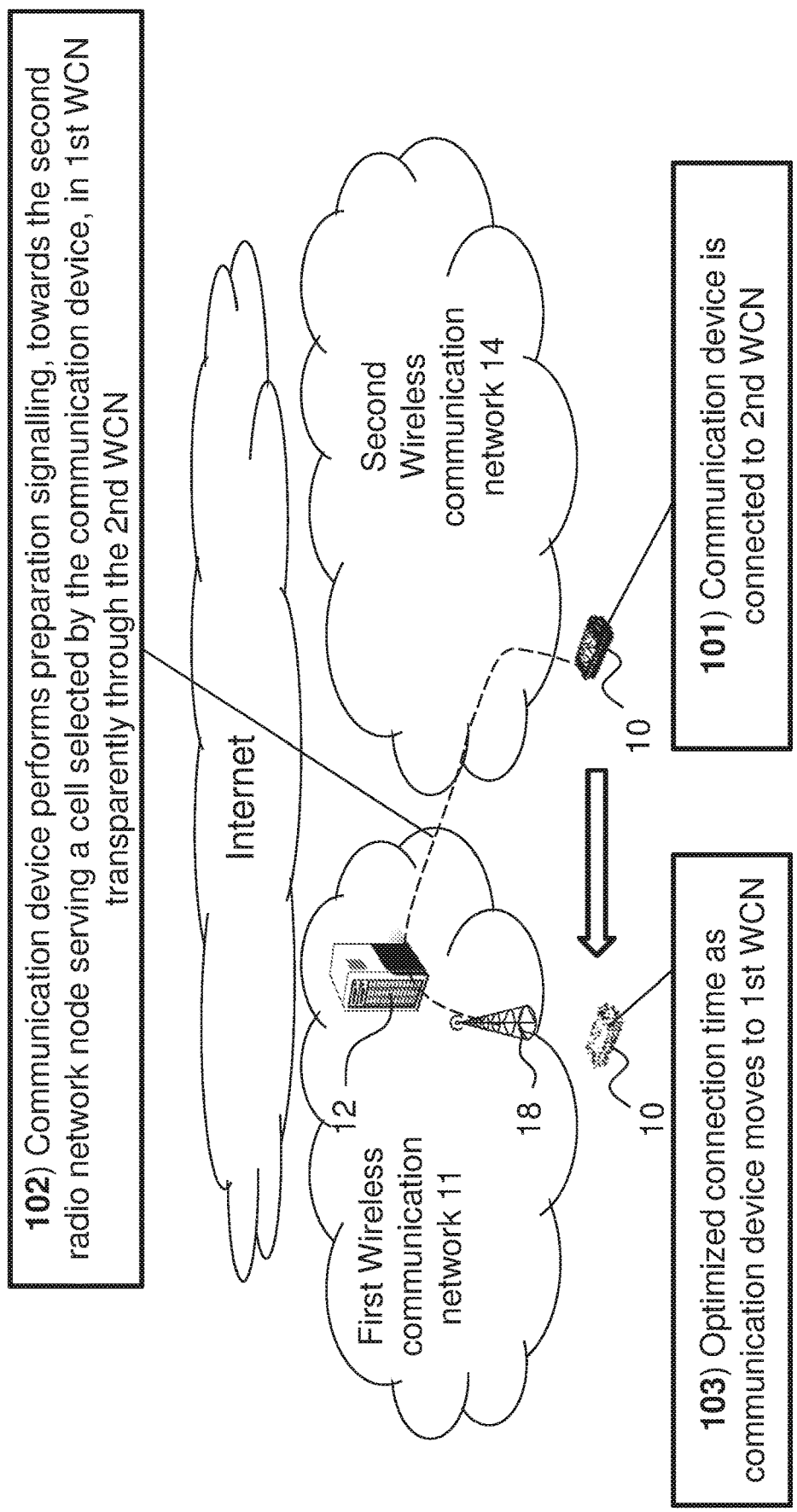
FIG. 10 is a schematic overview depicting a method in a communication network according to embodiments herein.

FIG. 10 is a high level network architecture depicting the communication network when the communication device 10 moves, from the second wireless communication network (WCN) 14, to the first wireless communication network (WCN) 11.

Action 101.

The communication device 10 is connected to the second WCN 14, e.g. PLMN X, provided by a second operator.

Action 102.

According to embodiments herein the communication device 10 performs preparation signalling with one or more wireless communication networks such as the first wireless communication network 11, such as PLMN A, provided by a first operator. The communication device 10 performs mobility preparation signaling, towards the second radio network node 18 serving the cell selected by the communication device 10, in 1st WCN 11 transparently through the 2nd WCN 14, i.e. towards a target wireless communication network. For example, the target cell is identified such as detected and then selected by the communication device 10 and the mobility preparation signaling is performed towards the radio network node, such as an eNB, controlling the target cell via a network node, such as an MME, in the target wireless communication network (and via intermediate nodes). The mobility preparation signaling can be performed in different ways as shown in the different embodiments below and depending on the solution and architecture for how different wireless communication networks are connected to each other. The main objective of embodiments herein is to improve inter-network mobility performance for active and connected mode single-radio communication devices i.e. to minimize a transition time while moving between different wireless communication networks.

Action 103.

An optimized connection time is achieved as communication device 10 moves to the first WCN. For example, the communication device 10 uses the preparation signalling to improve network mobility performance for active and connected mode communication devices as well as for communication devices in idle mode i.e. the communication device uses the preparation signaling to minimize the transition time while moving between different wireless communication networks. Hence, the wireless device 10 takes advantage of the preparation signaling. Two different wireless communication networks are shown in the FIG. 10 but it should be noted that embodiments herein also apply to all cases when the communication device 10 is capable to attach to two or more wireless communication networks. In the example shown, the communication device 10 triggers the preparation signaling towards the first wireless communication network 11, and in a typical case, the preparation signaling is only performed towards a single target network.

Embodiments herein further apply to different operational setups between operators: e.g. 3 WCNs such as PLMN A, B and X are operated by three different operators, whereby for example PLMN X can be operated by a Neutral Host operator, offering service in a local area to multiple operators' communication devices normally served by PLMN A or B outside that local area, as explained in the background section. For simplicity, in embodiments below, when describing mobility, the denotation Mobile Network Operator (MNO) and Neutral Host (NH) are used to represent two wireless communication networks between which the mobility occurs, and where the communication devices belong to subscribers of the MNO network. This should not be regarded as a limitation of the applicability of embodiments.

FIG. 10 also shows that the different wireless communication networks are also connected to "Internet". In some figures the terms "External IP network" or "Operator IP services . . . " are instead shown at this level. A typical example of an "External IP network" is the Internet. The "Operator IP services . . . " also typically provides access to the Internet. In addition, a small globe is in some figures herein used to denote "Internet", "Operator IP services etc. Finally, still another term used is "Data network" (in FIG. 27) and is to be seen as a synonym for any of the above.

Figure 11:
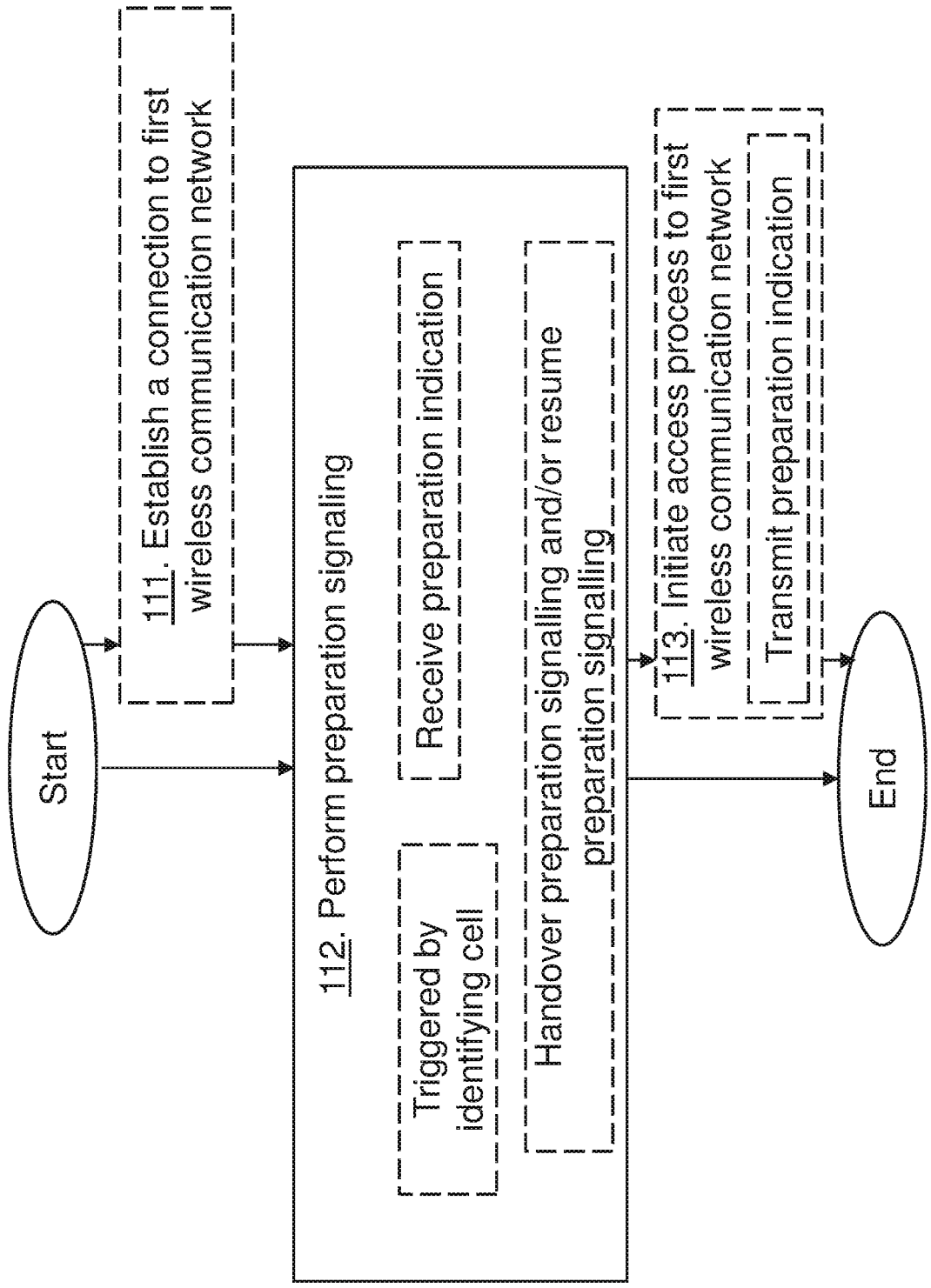
FIG. 11 is a flowchart depicting a method performed by a communication device according to embodiments herein.

The method actions performed by the communication device 10 for handling communication in the communication network comprising at least the first wireless communication network 11 and the second wireless communication network 14, said communication device 10 is served by the first radio network node 13 in the second wireless communication network 14 according to some embodiments will now be described with reference to a flowchart depicted in FIG. 11. The actions do not have to be taken in the order stated below, but may be taken in any suitable order. Actions performed in some embodiments are marked with dashed boxes.

Action 111.

The communication device 10 may establish a connection, e.g. a tunnel connection, transparently through the second wireless communication network 14, to the first wireless communication network 11.

Action 112.

The communication device 10 performs the preparation signaling, via the first radio network node 13 and transparently through the second wireless communication network 14, with the first network node 12 of the first wireless communication network 11. The preparation signaling is for preparing the first network node 12 and the second radio network node 18 in the first radio access network of the first communication network 11 with a pre-configuration for serving the communication device 10, which the preparation signaling comprises radio access network data, such as Access Stratum (AS) data, and core network data, such as Non Access Stratum (NAS) data, of the communication device 10. The radio access network data may comprise information for creation of communication device context in the first radio access network of the first wireless communication network 11. The radio access network data may be intended for the second radio network node 18 in the first radio access network of the first wireless communication network 11. The preparation signaling may comprise receiving, from the first network node 12, a preparation indication referencing a communication device context at the second radio network node 18 in the first radio access network of the first wireless communication network 11, such preparation indication may comprise a resume identity of the communication device 10, a handover reference of the communication device and/or similar. The performing of the preparation signaling may be triggered by identifying a cell, e.g. detecting the cell, of the second radio network node 18 in the first radio access network of the first wireless communication network 11. The preparation signaling may comprise handover preparation signalling and/or resume preparation signalling. Thus, the communication device 10 triggers preparation signaling via the current second wireless communication network 14 towards the first network node 12 in the surrounding first wireless communication network (on NAS-level), and the communication device 10 including information needed for handover preparation in the surrounding network. The signaling uses intermittent nodes of the serving second wireless communication network but the serving second wireless communication network is not involved in the actual content of the signals and does not need to be aware that the mobility is considered.

Action 113.

The communication device 10 may then initiate an access process to the first wireless communication network 11, which access process comprises an abbreviated signaling procedure comprising transmitting the preparation indication referencing the communication device context for the communication device in the first radio access network of the first wireless communication network 11. The communication device 10 triggering handover or e.g. resume towards the target cell in the surrounding first wireless communication network 11 prepared for handover or resume in a state of the art manner, thereby benefiting in mobility execution time from the fact that the surrounding first wireless communication network 11 is already prepared for the oncoming communication device 10.

Figure 12:
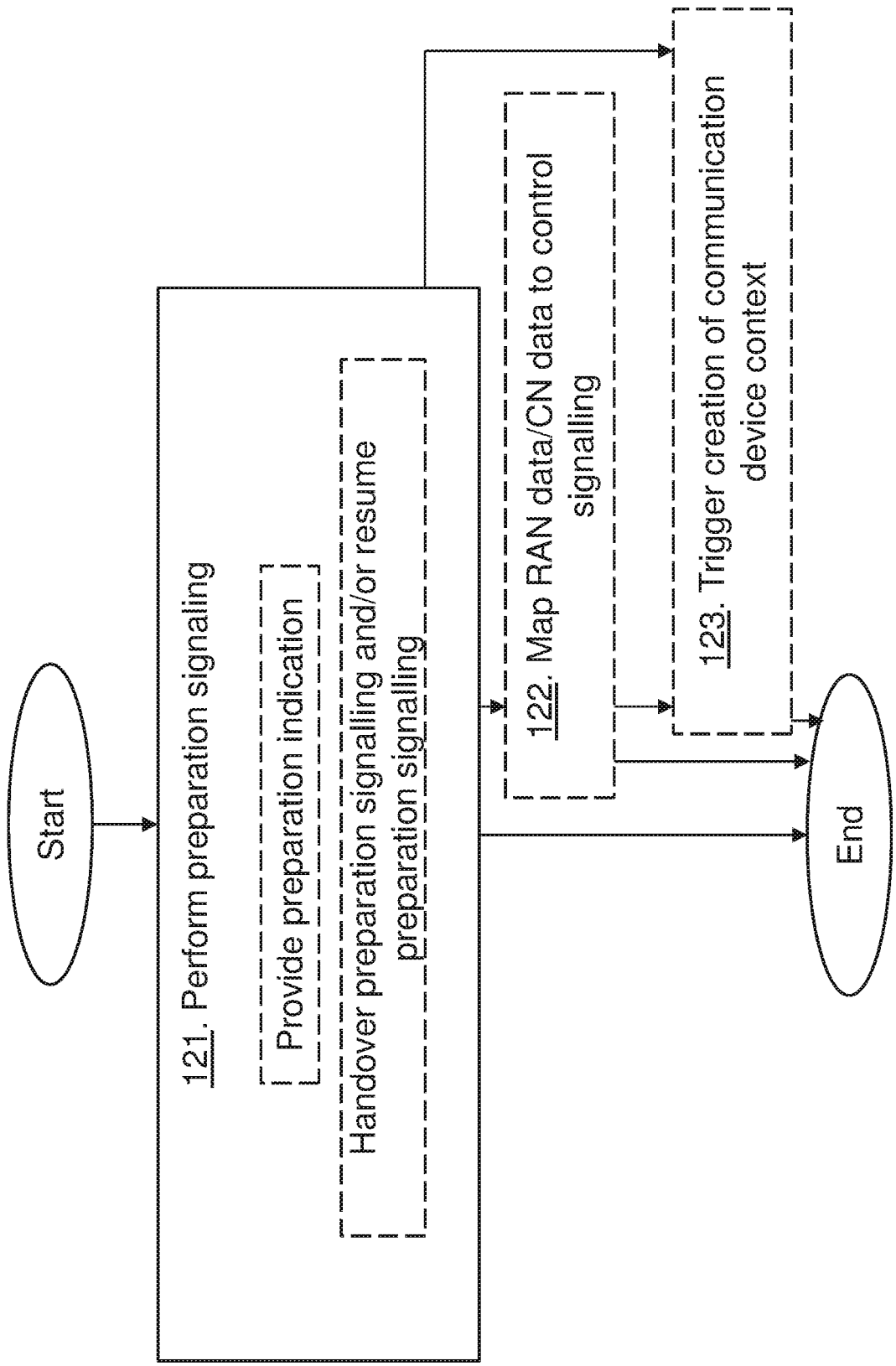
FIG. 12 is a flowchart depicting a method performed by a first network node according to embodiments herein.

The method actions performed by the first network node 12, such as an MME, for handling communication of the communication device 10 in the communication network according to some embodiments will now be described with reference to a flowchart depicted in FIG. 12. Actions performed in some embodiments are marked with dashed boxes. The communication network comprises at least the first wireless communication network 11 and the second wireless communication network 14, and the first network node 12 is comprised in the first wireless communication network 11 and the communication device 10 is served by the first radio network node 13 comprised in the second wireless communication network 14.

Action 121.

The first network node 12 performs the preparation signaling with the communication device 10, via the first radio network node 13 and transparently through the second wireless communication network 14. This is for preparing the first network node 12 and the second radio network node 18 in the first radio access network of the first communication network 11 with the pre-configuration for serving the communication device 10, which preparation signalling, from the communication device 10, comprises radio access network (RAN) data and core network data of the communication device 10. The radio access network data may comprise information for creation of the communication device context in the first radio access network of the first wireless communication network 11. The preparation signaling may comprise that the first network node 12 provides, to the communication device 10, a preparation indication referencing the communication device context at the second radio network node 18 in the first radio access network of the first wireless communication network 11. The preparation signaling may comprise handover preparation signalling and/or resume preparation signalling. The target core network node in the surrounding first wireless communication network 11 triggering handover preparation towards the target second radio network node 18 identified by the information provided by the communication device 10.

Action 122.

The first network node 12 may, when the radio access network data may be intended for the second radio network node 18 of the first wireless communication network 11, map the radio access network data and/or the core network data received over a user plane interface to a control signalling over a control plane interface to the second radio network node 18. It should be noted that this mapping from user plane to control plane may be performed by a PDN-GW but could also be performed in any other node e.g. in the MME, whereas the communication towards the second radio network node is typically performed by the MME. It should further be noted that the first network node may map core network data over a user plane to a control signaling over a control plane to another network node such as an MME. For example, PDN-GW receives preparation signalling from the communication device 10 as a user plane message. This signalling contains both CN and RAN data and denoted as a "New NAS message". The PDN-GW maps the user plane message to a control plane message, e.g. to GTP-C that is sent towards the MME (via SGW). When MME receives the control plane message the MME maps the received new NAS message to S1AP Handover Required message towards the second radio network node 18.

Action 123.

The first network node 12 may then trigger a creation of the communication device context in the second radio network node 18 in the first radio access network of the first wireless communication network 11 based on the information in the RAN data. The second radio network node 18 may then perform actions needed to prepare the handover and constructing a Handover/Relocation Command message and return it to the target first network node 12. The target first network node 12 may then signal e.g. the Handover/Relocation Command message to the communication device 10 (on NAS-level). The second radio network node 18 may e.g. select the "resume id" or "handover reference" and returns that to the first network node that then sends it to the communication device.

Figure 13:
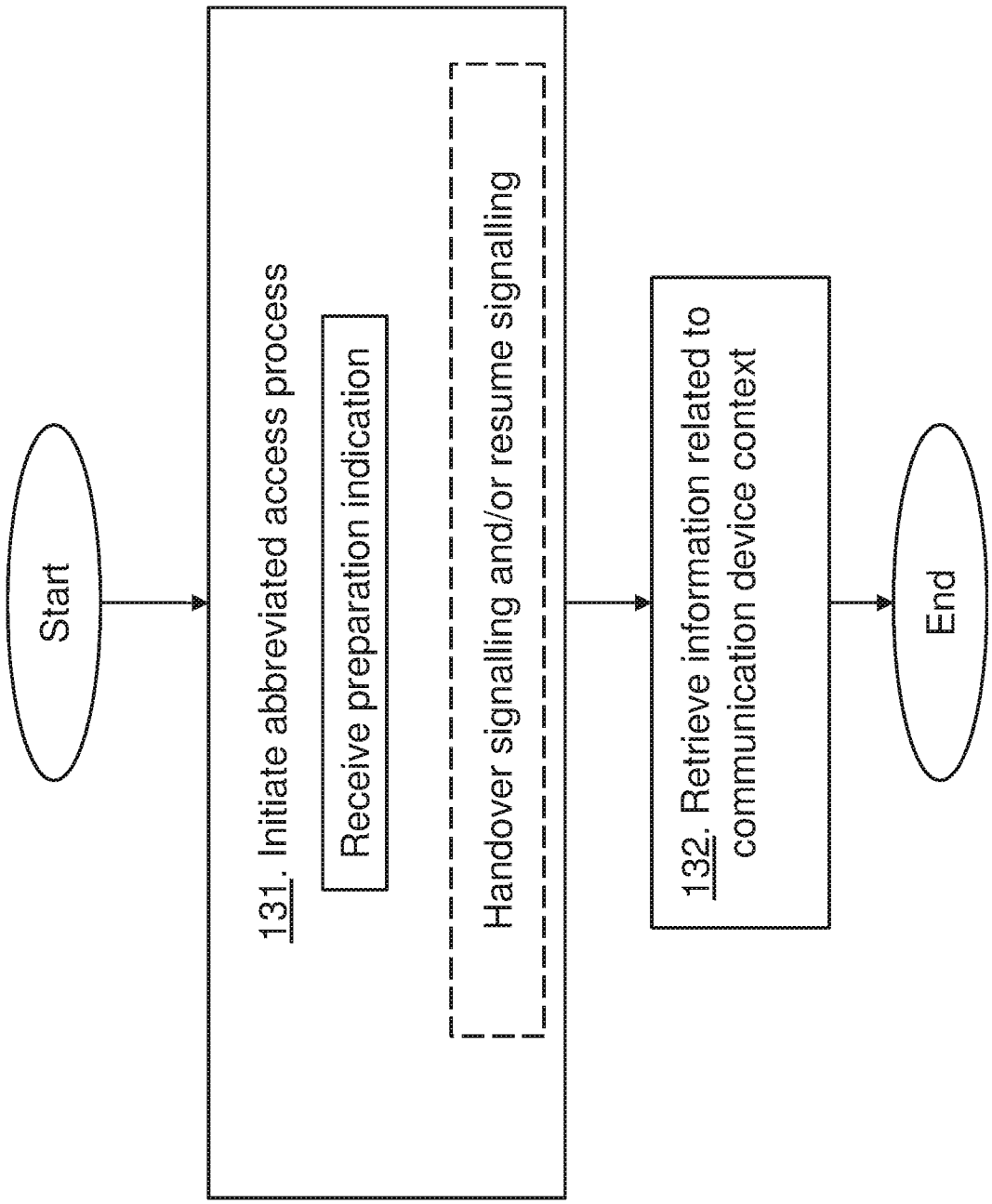
FIG. 13 is a flowchart depicting a method performed by a second radio network node according to embodiments herein.

The method actions performed by the second radio network node 18, such as an radio base station or eNodeB, for handling communication of the communication device 10 in the communication network according to some embodiments will now be described with reference to a flowchart depicted in FIG. 13. The actions do not have to be taken in the order stated below, but may be taken in any suitable order. Actions performed in some embodiments are marked with dashed boxes. The communication network comprises at least the first wireless communication network 11 and the second wireless communication network 14. The second radio network node 18 is comprised in the first radio access network in the first wireless communication network 11 and the communication device 10 initiates an access to the cell of the second radio network node 18.

Action 131.

The second radio network node 13 initiates an abbreviated access process, for the communication device 10, to the first radio access network in the first wireless communication network 11. The abbreviated access process comprises: receiving, from the communication device 10, the preparation indication indicating the abbreviated access process. The preparation indication, e.g. resume identity of the communication device, handover reference of the communication device and/or similar, referencing the communication device context for the communication device in the first radio access network of the first wireless communication network 11. The communication device context is configured from the preparation signaling from the communication device 10 in the second wireless communication network 14 via the first radio network node 13 in the second wireless communication network 14 and transparently through the second wireless communication network 14. The preparation signaling comprises providing the preparation indication to the communication device 10. The communication device may thus send the preparation indication to the second radio network node 13 which then initiates the abbreviated access process e.g. for resume signaling or for handover signaling.

Action 132.

The second radio network node 13 retrieves, e.g. from another network node or from the second radio network node (within), information related to the communication device context for serving the communication device 10 for the initiated abbreviated access process using the preparation indication. The initiated abbreviated access process may be for resume signaling or for handover signaling.

The communication device 10 may thus rapidly establish an access using this abbreviated access process, e.g. for resume signaling or for handover signaling, to the first wireless communication network 11 via the second radio network node 18.

Figure 14:
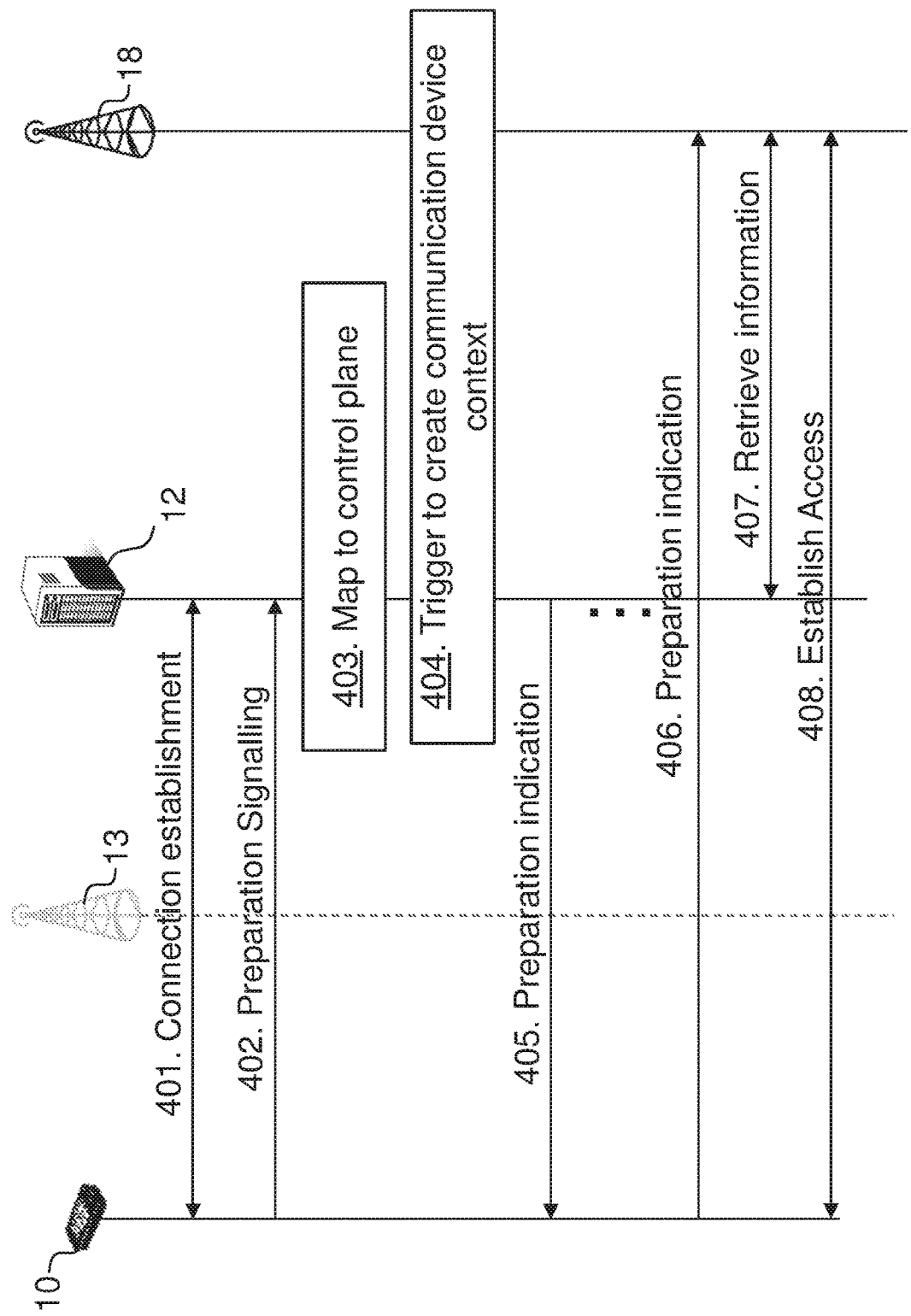
FIG. 14 is a combined flowchart and signalling scheme according to embodiments herein.

FIG. 14 is a combined flowchart and signaling scheme according to embodiments herein.

Action 401.

The communication device 10 establishes the connection, the tunnel, to the first network node 12.

Action 402.

The communication device 10 and the first network node perform the preparation signaling. For example, the first network node 12 in the surrounding first wireless communication network triggers a suspend/resume preparation towards a target radio network node such as the second radio network node 18 identified by the information provided by the communication device 10. The information may e.g. be an identity of the second radio network node 18 such as a Global eNB identity. The identity may be read by the communication device 10 from broadcasted System Information of the cell(s), e.g. from SIB1, of the second radio network node 18. This corresponds to the actions 112 and 121 above.

Action 403.

The first network node 12 may map data of user plane to data of control plane down to the second radio network node 18. This part may be performed for the whole preparation signalling when the communication device 10 starts communication with the first network node 12 using the core network data. One example is that a PGW does the mapping from received user plane signalling to control plane signalling. This applies both for the core network data and the radio access network data and happens before the first network node 12 receives the first request from the communication device 10. And the same action, but reverse, is also needed when the first network node 12 sends the response back to the communication device 10, see action 405.

Action 404.

The first network node 12 may then trigger the creation of the communication device context based on the information in the RAN data. I.e. that first network node 12 triggers the communication device context establishment by forwarding communication device information, e.g. radio bearers to be established/setup, security context, communication device security capabilities and Source to Target transparent (RAN) container, and then the second radio network node 12 creates the communication device context based on the information. The first network node 12 may also create a local communication device context.

Hence, the first network node 12 may use the received RAN data and core network data to pre-configure the RAN for serving the communication device 10. For example, the second radio network node 18 may perform actions needed to prepare suspend/resume and constructing e.g. a Resume Command message and returning it to the first network node 12.

Action 405.

The first network node 12 may then provide, i.e. transmit, the preparation indication to the communication device 10. The first network node 12 may e.g. signal the Resume Command message, being an example of the preparation indication, to the communication device 10 (on NAS-level).

Action 406.

The communication device 10 then initiates an access to the cell of the second radio network node 18 and sends e.g. the preparation indication to the second radio network node 18. For example, the communication device 10 triggers resume towards a target cell in the surrounding wireless communication network prepared for resume, thereby benefiting in mobility execution time from the fact that the surrounding wireless communication network is already prepared for the incoming communication device 10. This corresponds to the action 131 above.

Action 407.

The second radio network node 18 may then initiate the abbreviated access process using the received preparation indication referencing the communication device context, and the second radio network node 18 may retrieve information, i.e. the prepared communication device context, enabling access for the communication device rapidly.

Action 408.

The communication device 10 may then rapidly establish an access to the first wireless communication network 11 via the second radio network node 18.

Embodiments herein disclose ways to minimize communication device mobility transfer time in connected mode between a current wireless communication network and at least one surrounding wireless communication network, and with minimum business and technical coordination between the network operators also when operating in single-radio conditions. (Single-radio conditions mean conditions when separate radio paths are not feasible, e.g. due to a communication device with a single radio and/or unfortunate spacing of channels, creating intermodulation products that disable the radio parts to operate simultaneously.) The minimization of mobility transfer time is done by preparatory signaling preceding mobility, between the communication device 10 and surrounding wireless communication network via the current serving wireless communication network.

The main parts of description are given in the context of the S2a interface based solutions. Embodiments may be applied when other than S2a interface based solutions are used to connect the different wireless communication networks. Examples of such solutions are solutions based on the interfaces S1, S5/S8 and SWu/S2b. In addition, solutions for cases of "no-integration" and "non-3GPP access in 5G" are also below briefly described. The second radio network node 18 is exemplified below as a base station such as an eNB or similar and the first network node 12 is exemplified as a gateway or an MME.

Figure 15:
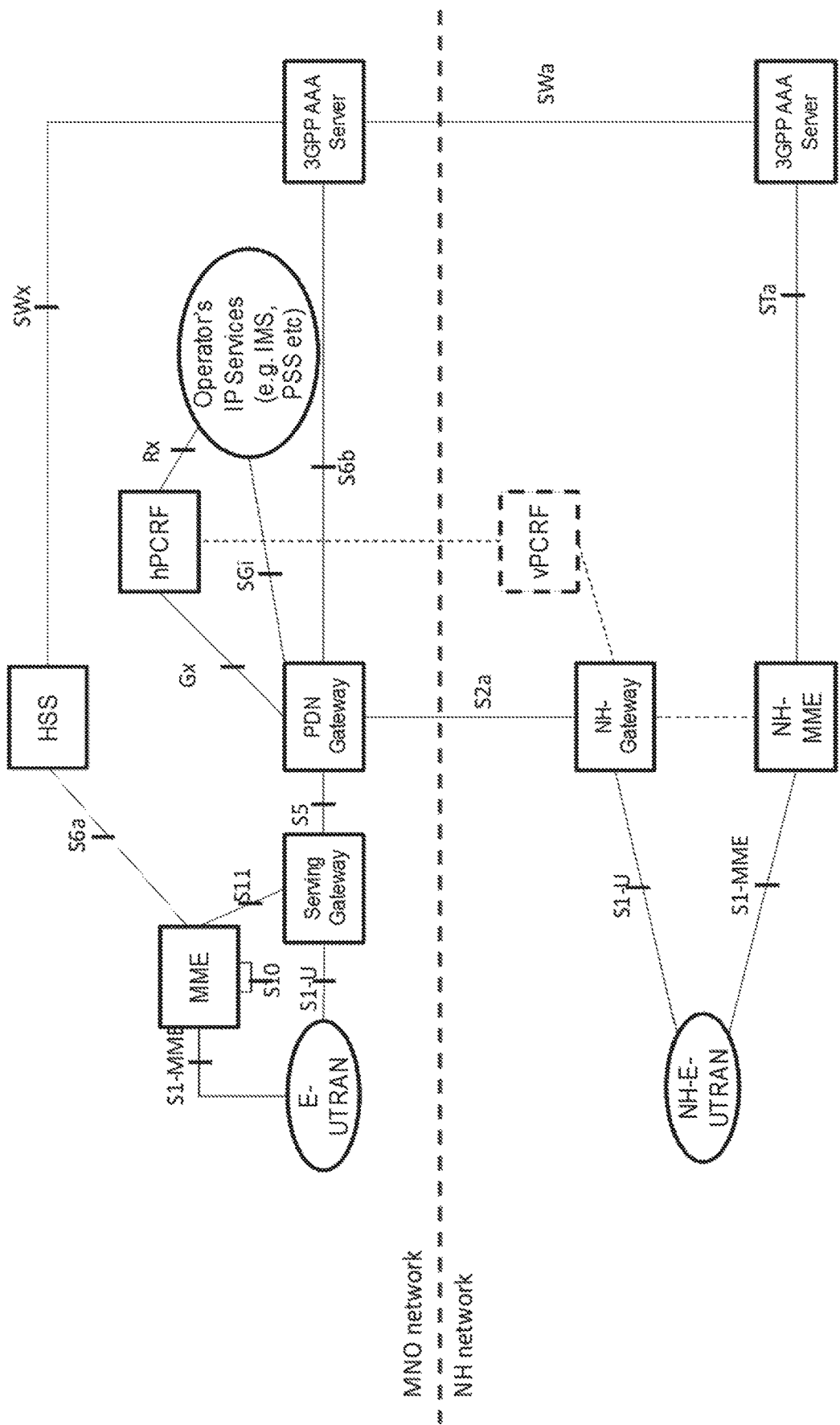
FIG. 15 is a schematic overview depicting a communication network according to embodiments herein.

FIG. 15 shows some embodiments in the context of the S2a interface based solutions, and where communication devices belong to subscribers of a MNO network and mobility occurs between this network and a NH network. Below descriptions describe communication device triggered handover preparation for the direction NH→MNO and further describe it for the direction MNO→NH.

FIG. 15 shows the overall network-side architecture. Some nodes, e.g. the PCRFs, are optional. In addition, all nodes are not shown, for example the E-UTRAN on MNO network side contains eNBs as normally and in the same way the NH-E-UTRAN contains NH-eNBs. These nodes are however visible in the signaling flows.

In order to perform the target side preparations, the communication device 10, denoted below as UE1, exchanges signaling with the target side. This is shown in FIG. 16. UE1 is served by the NH network and prepares a target cell in the MNO network (as shown with the dashed dot line between the UE1 and the first network node 12 exemplified as an MME, and then "dotted" line between the first network node 12 and the second radio network node 18 e.g. eNB). UE1 communicates with an MNO eNodeB using the following path in both directions: UE1-NH eNodeB-NH-GW-MNO PDN-GW-MNO SGW-MNO MME-MNO eNodeB. Therefore, UE1 is communicating using user plane data in the current serving network. This user plane communication is transformed to control plane connectivity in one of the nodes, e.g. the any gateway or the MME, on the path to the target network. For example the MNO PDN-GW receives user plane data from the current serving network of the UE1 and transforms this to control plane signaling towards the MNO MME (via MNO SGW), and then further to the MNO eNodeB.

The signaling ultimately targets the target RAN node(s), such as the second radio network node 18, i.e. MNO eNodeB in MNO E-UTRAN, via the target MME in MNO network. The address used to reach the target MME is the Tracking Area Identity (TAI) incl. PLMN-ID) and Tracking Area Code (TAC), and the identity used by the target MME to select the correct target RAN node is an eNB identity, for example the Global eNB identity. Both TAI and eNB identity can be read by the UE1 from the broadcasted System Information of the target cell(s), e.g. from SIB1.

Due to the non-traditional signaling path, addressing rules are added and described below. In order to achieve a consistent set of configurations between target side Core and Radio Network nodes, the UE-signaling terminates in the MME, which creates the signaling towards the target RAN node(s), (almost) as if it were a classical handover preparation. In addition, the signaling may comprise Access Stratum (AS) level of information exchanged between the communication device 10 and the MNO eNodeB that is transparently forwarded by the different nodes in e.g. AS level transparent containers in both directions.

Figure 17:
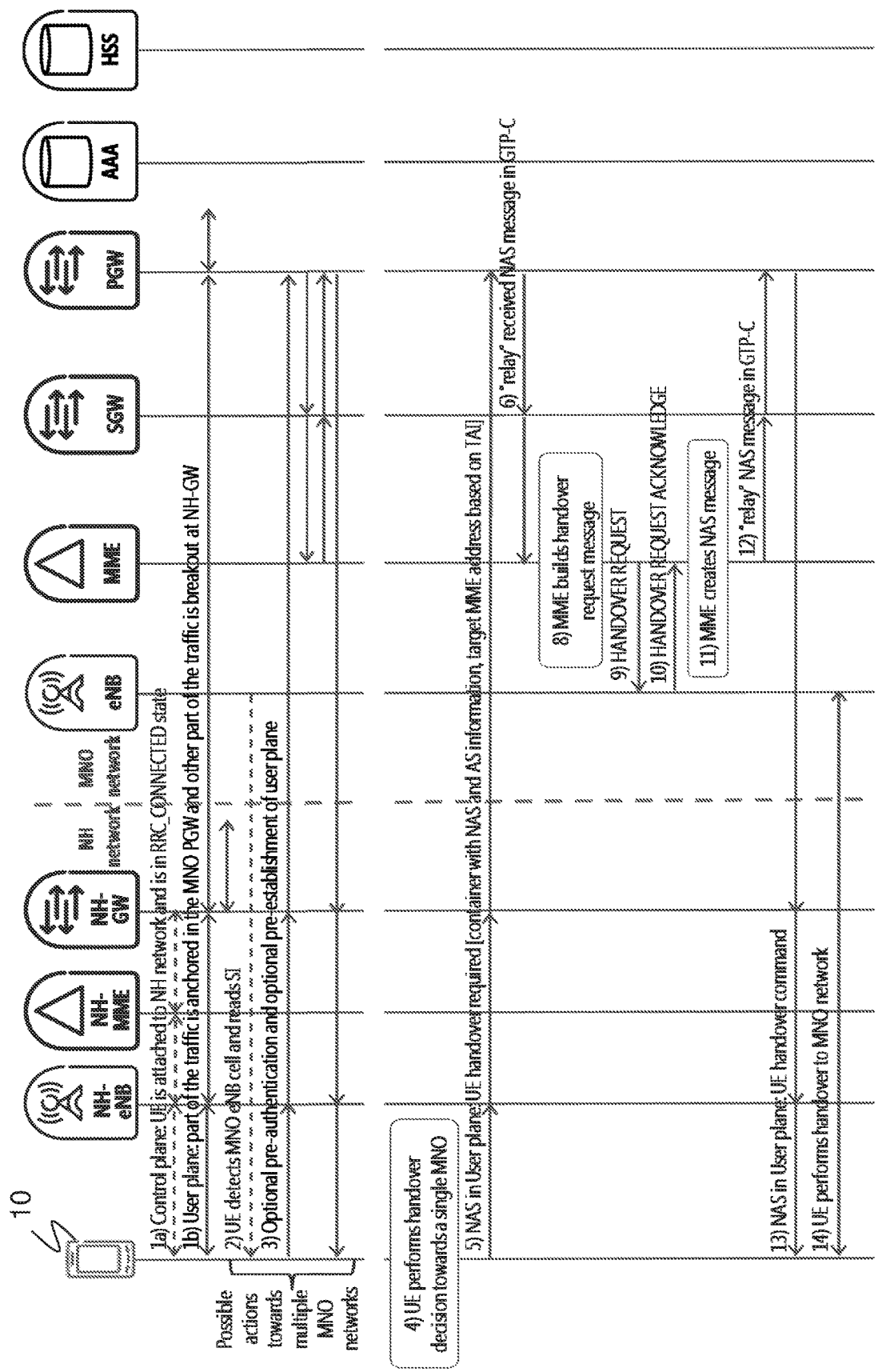
FIG. 17 is a signalling scheme according to some embodiments herein.

FIG. 17 shows the signaling flow for communication device triggered handover preparation in the direction from NH network to the MNO network. The different steps shown in the figure are described below.

The following steps are shown in FIG. 17:

The communication device 10 is attached to NH network and is in active/connected state i.e. in Radio Resource Control (RRC)_CONNECTED state. In control plane there are communication device contexts in NH-eNB, NH-MME and NH-GW (shown in step 1a). In user plane (shown in step 1b), there are communication device contexts in NH-eNB and NH-GW and some of the traffic (e.g. selected bearers) are anchored in the MNO PDN-GW (i.e. PGW) while other part of the traffic is locally breakout in the NH-GW.

Steps 2-3 can be performed by the communication device 10 towards multiple MNO networks. These steps can be seen as preparations for the case when the communication device 10 later on decides to perform communication device triggered handover preparation to one of these MNO networks.

Step 2: The communication device 10 detects a cell controlled by MNO eNB and reads the needed system information. SIB1 contains the PLMN-ID, Tracking Area Code and Cell Identity. The PLMN-ID and the TAC comprise the TAI that can be used to identify a target MME in the MNO network. Cell Identity includes both an eNB Identity of the target eNB and a cell identifier for a cell controlled by the target eNB. This step can be a continuous activity performed by the communication device 10 and may also include measurement of the different cells in different MNO networks for selection of specific target cell in step 4.

Step 3: The communication device 10 optionally performs pre-attach (incl. pre-authentication) and pre-establishment of user plane in the MNO network. The only mandatory part is the pre-authentication as there is a need to establish security context between the communication device 10 and the target MME in the MNO network. Rest of the needed information can be provided to the target MME as part of communication device triggered handover preparation (in step 5). The need for this step depends on a) if the communication device is already attached in the MNO network and b) if there is a need to establish additional user plane bearers for the communication device in the MNO network before handover to the MNO network.

Steps 4-14 are the main step sequence according to some embodiments herein. The basic principle is that the communication device 10 and the target first network node 12 such as the MME communicate using new type of Non Access Stratum (NAS) signaling. This NAS signaling may be sent using user plane in the NH network and may be sent to the PDN-GW in the MNO network. If the communication device 10 is already attached in the MNO network, then the PGW already has an association for the current MME for the communication device 10 and forwards the signaling to that MME (via the SGW). The PDN-GW or SGW may also select another MME based on TAI provided by the communication device 10. This is needed in the case when the PDN-GW or SGW can identify that the current MME for the communication device is not belonging to the TAI signaled from the communication device. The PDN-GW takes the NAS signaling PDU from the received used plane and forwards it to the current or selected MME using the TAI via the SGW. The SGW performs similar routing for the case when a new MME was selected, otherwise it uses the existing signaling association for the communication device and forwards the NAS PDU to the MME. The return path for the NAS signaling from the target MME to the communication device, steps 12-13 takes the reverse path, i.e. MME→SGW→PGW in MNO's network and then→NH-GW→NH-eNB→communication device. It should be noted that the steps 4-12 can be performed towards multiple WCNs or network nodes.

Step 4: The communication device 10 identifies the need to perform handover towards one of the MNO networks. The need to perform handover may be based on both local measurements of the current NH cell and measurements of different MNO cells in the prepared MNO networks. The communication device 10 selects one target MNO cell and triggers an indication to be transmitted to the NH-eNB and its up to the eNB to decide whether to perform handover towards that cell.

Step 5: The communication device 10 creates a new NAS message indicating UE handover required, and sends this message towards a target MME connected to the eNB controlling the selected target cell. The new NAS message contains both NAS and AS information according to embodiments herein. This is an example of action 112 above. The main address information needed for the target MME is the eNB identity and the cell identity of the target cell selected by the communication device is needed by the target eNodeB. The NAS message passes different nodes in both NH and MNO networks as described above before step 4.

Step 6: The PDN-GW takes the new NAS PDU received in user plane from the communication device and forwards it to the SGW using GPRS Tunneling Protocol-Control (GTP-C).

Step 7: The SGW forwards the new NAS PDU received in GTP-C towards the MME, again in GTP-C.

Step 8: The target MME builds a (S1AP) HANDOVER REQUEST message based on information received in the new NAS PDU message, and also information locally available in the target MME. Information about the target cell (as received from the communication device 10) is included in the message. The (S1AP) HANDOVER REQUEST message may also contain any AS information received by the target MME from the communication device 10.

Step 9: The target MME sends the (S1AP) HANDOVER REQUEST message to the eNB. The correct eNB is identified by the eNB identity the target MME received from the communication device 10. Steps 8 and 9 are examples of the action 121 above.

Step 10: The target eNB performs handover preparation for the communication device in the indicated target cell. The target eNB creates a (S1AP) HANDOVER REQUEST ACKNOWLEDGE message and returns it to the target MME. The (S1AP) HANDOVER REQUEST ACKNOWLEDGE message may also contain any AS information sent from the target eNB to the communication device, e.g. a Handover/Relocation Command message.

Step 11: The target MME creates a new NAS message, UE or communication device Handover Command.

Step 12: The target MME sends the new NAS message towards to the communication device 10 via the SGW using GTP-C. The SGW forwards the new NAS message received in GTP-C to the PDN-GW.

Step 13: The PDN-GW takes the received new NAS message and inserts it to user plane packet and sends it towards the communication device 10 (via NH-GW and NH-eNB). The communication device 10 receives the new NAS message.

Step 14: The communication device 10 performs handover to the MNO network based on the information received in the new NAS message, including any AS information sent from the target eNB to the communication device 10. This is an example of action 113.

Figure 18:
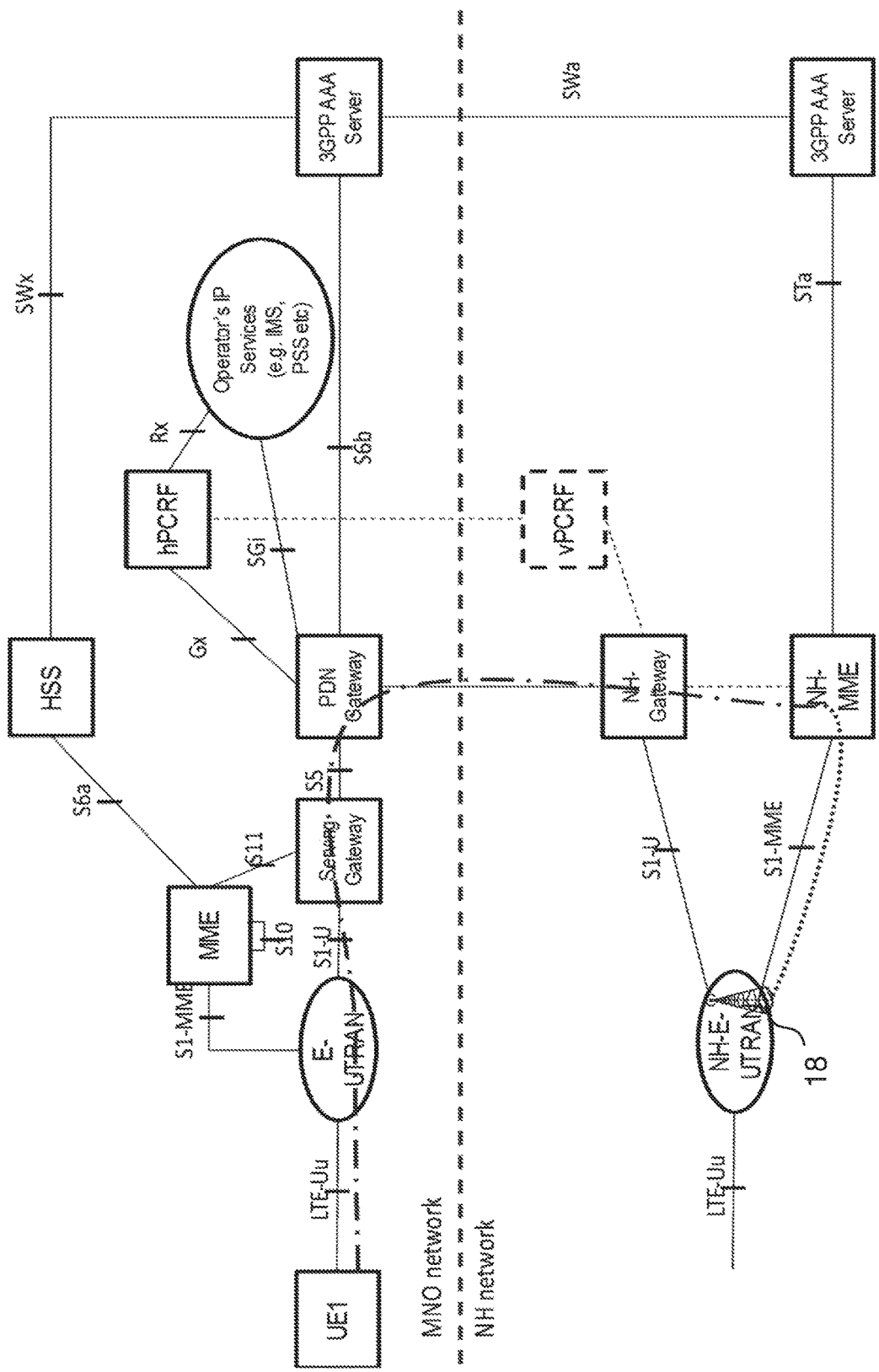
FIG. 18 is a schematic overview depicting a communication network according to embodiments herein.

Communication device-triggered handover preparation from MNO→NH: In order to perform the target side preparations, the communication device 10 may exchange signaling with the target side. This is shown in FIG. 18. UE1 is served by the MNO network and prepares a target in the NH network (as shown with the dashed dot line between the UE1 and the first network node 12 exemplified as an NH-MME, and then "dotted" line between the first network node 12 and the second radio network node 18 e.g. NH-eNB)). UE1 communicates with a NH-eNB using the following path in both directions: UE1-MNO eNB-MNO SGW-MNO PDN-GW-NH-GW-NH-MME-NH-eNB. Also in this case, UE1 is communicating using user plane data in the current serving network. This user plane communication is transformed to control plane connectivity in one of the nodes on the path to the target network. For example, either the MNO PDN-GW or the NH-GW receives user plane data from the current serving network of the UE1 and transforms this to control plane signaling towards the NH-MME, and then further to the NH-eNB.

The signaling ultimately targets the target RAN node(s) (i.e. NH-eNB in NH-E-UTRAN) via the target NH-MME. The address used to reach the target NH-MME is the TAI (incl. PLMN-ID and TAC), and the identity used by the target NH-MME to select the correct target NH-eNB is an eNB identity, for example the Global eNB identity. Both TAI and eNB identity can be read by the UE1 from the broadcasted System Information of the target cell(s), e.g. from SIB1.

Due to the non-traditional signaling path, addressing rules are again added and described below. In order to achieve a consistent set of configurations between target side Core and Radio Network nodes, the communication device-signaling terminates in the NH-MME, which creates the signaling towards the target NH RAN node(s), (almost) as if it were a classical handover preparation. In addition, the signaling may comprise AS level of information exchanged between the communication device and the NH-eNB that is transparently forwarded by the different nodes in e.g. AS level transparent containers in both directions.

Figure 19:
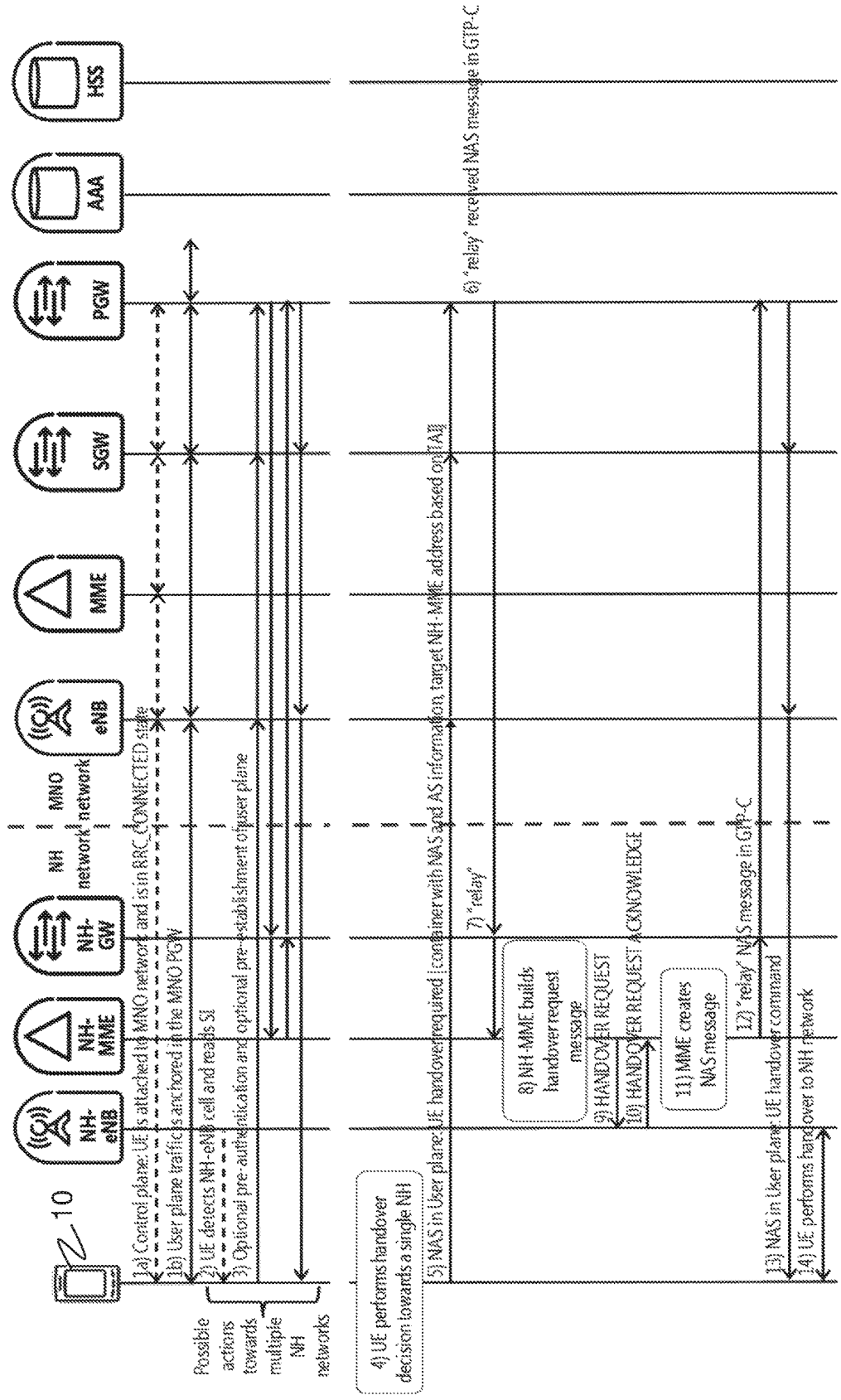
FIG. 19 is a signalling scheme according to some embodiments herein.

FIG. 19 shows the signaling flow for communication device triggered handover preparation in the direction from MNO network to the NH network. The different steps shown in the figure are described below.

The following steps are shown in FIG. 19:
Step 1: The communication device is attached to MNO network and is in active/connected state i.e. in RRC_CONNECTED state. In control plane there are communication device contexts in eNB, MME, SGW and PGW (shown in step 1a). In user plane, there are UE contexts in eNB, SGW and PGW (shown in step 1b).

Steps 2-3 can be performed by the communication device 10 towards multiple NH networks. These steps can be seen as preparations for the case when the communication device later on decides to perform communication device triggered handover preparation to one of these NH networks.

Step 2: The communication device 10 detects a cell controlled by NH-eNB and reads the needed system information. SIB1 contains the PLMN-ID, Tracking Area Code and Cell Identity. The PLMN-ID and the TAC comprise the TAI that can be used to identify a target NH-MME in the NH network. Cell Identity includes both an eNB Identity of the target NH-eNB and a cell identifier for a cell controlled by the target NH-eNB. This step can be a continuous activity performed by the communication device 10 and may also include measurement of the different cells in different NH networks for selection of specific target cell in step 4.

Step 3: The communication device 10 optionally performs pre-attach (incl. pre-authentication) and pre-establishment of user plane in the NH network. The only mandatory part is the pre-authentication as there is a need to establish security context between the communication device 10 and the target NH-MME in the NH network. Rest of the needed information can be provided to the target NH-MME as part of communication device triggered handover preparation (in step 5). The need for this step depends on a) if the UE is already attached in the NH network and b) if there is a need to establish additional user plane bearers for the communication device 10 in the NH network before handover to the NH network.

Steps 4-14 are steps according to embodiments herein. The basic principle is that the communication device 10 and the target NH-MME communicate using new type of NAS signaling. This NAS signaling is sent using user plane in the MNO network and is sent to the PDN-GW in the MNO network. If the communication device 10 is already attached in the NH network and has at least one PDN connection anchored in the PDN-GW in the MNO network, the PDN-GW already has an association to the current NH-GW for the communication device 10 and forwards the signaling to that NH-GW. NH-GW forwards the NAS signaling further to the NH-MME. In other cases, the MNO PDN-GW may select any NH-GW known to be part of the NH network that the NAS signaling is targeted for, for example based on the TAI provided by the communication device. In a similar way the NH-GW may select a NH-MME in the NH network. The PDN-GW takes the NAS signaling PDU from the received used plane and forwards it to the current or selected NH-MME via the NH-GW. The NH-GW performs similar routing for the case when a new NH-MME was selected, otherwise it uses the existing signaling association for the communication device and forwards the NAS PDU to the NH-MME. The return path for the NAS signaling from the target NH-MME to the UE takes the reverse path, i.e. NH-MME→NH-GW→MNO PGW→MNO SGW→UE. It should be noted that the steps 4-12 can be performed towards multiple WCNs or network nodes.

Step 4: The communication device 10 identifies the need to perform handover towards one of the NH-MNO networks. The need to perform handover may be based on both local measurements of the current MNO cell and measurements of different NH cells in the prepared NH networks. The communication device 10 selects one target NH cell and decides to perform handover towards that cell. Thus, the communication device 10 triggers an indication to be transmitted to the NH-eNB and its up to the NH-eNB to decide whether to perform handover towards that cell or not.

Step 5: The communication device 10 triggers a new NAS message indicating communication device handover required, and sends this message towards a target NH-MME connected to the NH-eNB controlling the selected target cell. The new NAS message contains both NAS and AS information. The main address information needed for the target NH-MME is the NH-eNB identity and the cell identity of the target NH cell selected by the UE is needed by the target NH-eNB. The signaling between the target NH-MME and the communication device traversed through different nodes in MNO and NH networks as described above before step 4. This is an example of action 112 above.

Step 6: The PDN-GW takes the new NAS PDU received in user plane from the communication device 10 and forwards it to the NH-GW using GTP-C.

Step 7: The NH-GW forwards the new NAS PDU received in GTP-C towards the NH-MME, again in GTP-C.

Step 8: The target NH-MME builds a (S1AP) HANDOVER REQUEST message based on information received in the new NAS PDU message, and also information locally available in the target NH-MME. Information about the target NH cell (as received from the communication device 10) is included in the message. The (S1AP) HANDOVER REQUEST message may also contain any AS information received by the target NH-MME from the communication device 10.

Step 9: The target NH-MME sends the (S1AP) HANDOVER REQUEST message to the NH-eNB. The correct NH-eNB is identified by the eNB identity the target NH-MME received from the communication device 10. Steps 8 and 9 are examples of the action 121 above.

Step 10: The target NH-eNB performs handover preparation for the communication device 10 in the indicated target NH cell. The target NH-eNB creates a (S1AP) HANDOVER REQUEST ACKNOWLEDGE message and returns it to the target NH-MME. The (S1AP) HANDOVER REQUEST ACKNOWLEDGE message may also contain any AS information sent from the target NH-eNB to the communication device 10, e.g. a Handover/Relocation Command message.

Step 11: The target NH-MME creates a new NAS message, communication device Handover Command.

Step 12: The target NH-MME sends the new NAS message towards to the communication device 10 via the NH-GW using GTP-C. The NH-GW forwards the new NAS message received in GTP-C to the PDN-GW.

Step 13: The PDN-GW takes the received new NAS message and inserts it to user plane packet and sends it towards the communication device 10 (via SGW and eNB). The communication device 10 receives the new NAS message.

Step 14: The communication device 10 performs handover to the NH network based on the information received in the new NAS message, including any AS information sent from the target NH-eNB to the communication device 10.

The solution may be described in the context of the S2a interface based solution, and where communication devices belong to subscribers of a MNO network and mobility occurs between this network and a NH network. In the S2a context, the suspend/resume procedure may replace the handover procedure for inter-network mobility, and thus embodiments herein may also be applied to the suspend/resume procedure. Below is it described communication device triggered suspend/resume preparation for the direction NH→MNO and also the process for the other direction MNO→NH.

The overall network-side architecture shown in FIG. 15 applies also for this embodiment.

Figure 20:
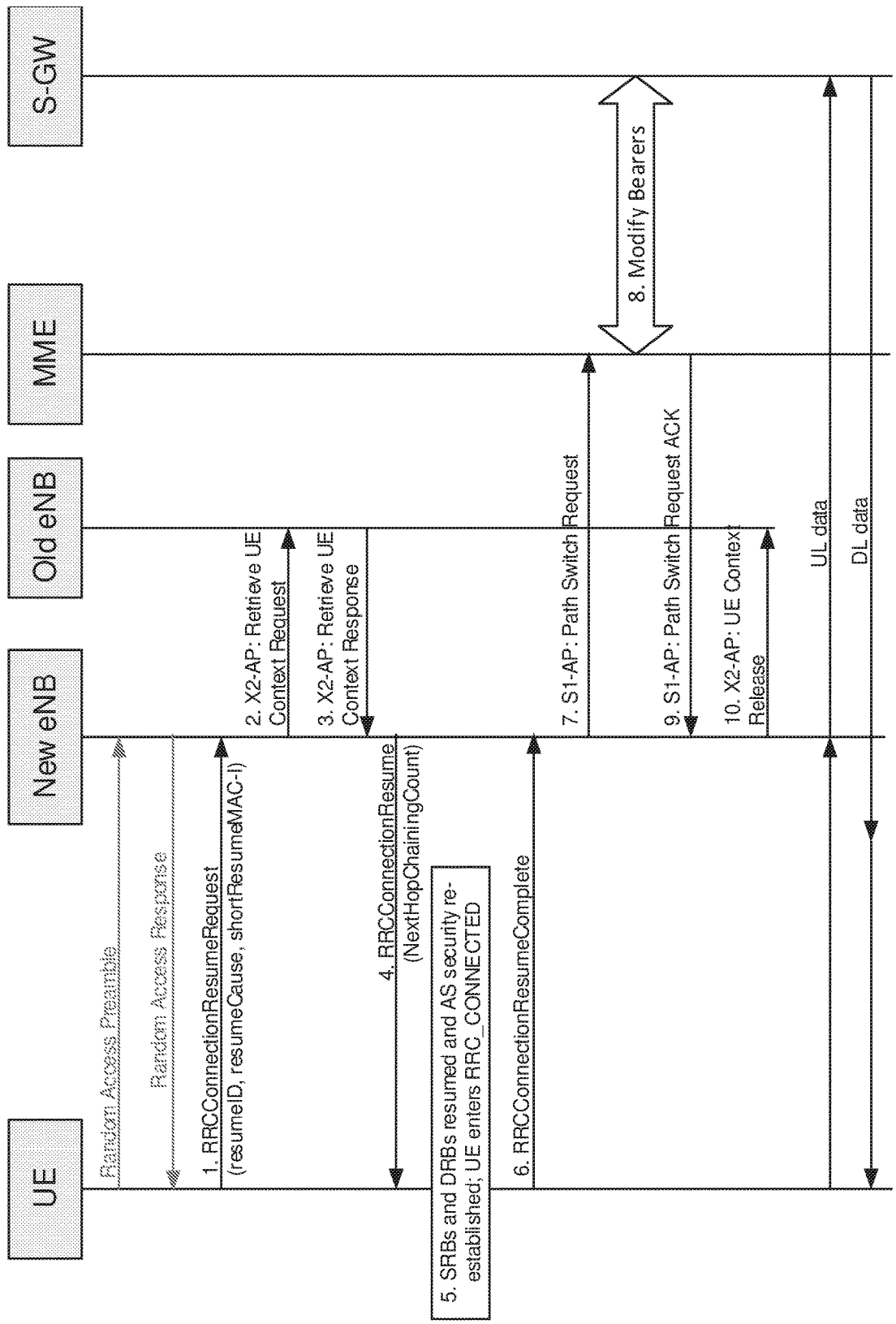
FIG. 20 is a signalling scheme according to some embodiments herein.

The communication device triggered suspend/resume preparation, or shortly resume preparation, has many similarities with the handover preparation in embodiment above. The main difference is that the communication device may perform the resume towards another target RAN node than the node where suspend preparation was performed to. This is based on RAN-level mechanisms to retrieve the communication device context needed for resume from another RAN node over X2-interface. See e.g. 36.300 v. 14.4.0 FIG. 7.3a.3-3. FIG. 20 discloses a resume functionality according to prior art. The old eNB is found using the IE Resume ID. According to TS 36.423 v. 14.0.0 the 20 most significant bits are used to indicate the eNB-ID where the suspend operation took place. The X2AP Retrieve UE Context procedure fetches the communication device context. The IE shortResumeMAC-I included in the RRCConnectionResumeRequest provides the message integrity check.

Communication device-triggered suspend/resume preparation where the communication device moves from NH→MNO. The signaling path shown in FIG. 16 applies also here.

FIG. 21 shows the signaling flow for communication device triggered suspend/resume preparation in the direction from NH network to the MNO network. The different steps shown in the figure are described below.

It is also possible to relay parts of the NAS message to the eNB, which then "echoes" the Suspend request back to MME. This option can re-use one procedure of current TS 36.413 V14.4.0 design shown in FIG. 22 disclosing Rel-13 S1-AP procedure for eNB to request suspension.

The following steps are shown in FIG. 21. FIG. 21 is quite similar to FIG. 17.

The communication device 10 is attached to NH network and is in active/connected state i.e. in Radio resource Control (RRC)_CONNECTED state. In control plane there are communication device contexts in NH-eNB, NH-MME and NH-GW (shown in step 1a). In user plane (shown in step 1b), there are communication device contexts in NH-eNB and NH-GW and some of the traffic (e.g. selected bearers) are anchored in the MNO PDN-GW (i.e. PGW) while other part of the traffic is locally breakout in the NH-GW.

Steps 2-3 can be performed by the communication device 10 towards multiple MNO networks. These steps can be seen as preparations for the case when the communication device 10 later on decides to perform communication device triggered handover preparation to one of these MNO networks.

Step 2: The communication device 10 detects a cell controlled by MNO eNB and reads the needed system information. SIB1 contains the PLMN-ID, Tracking Area Code and Cell Identity. The PLMN-ID and the TAC comprise the TAI that can be used to identify a target MME in the MNO network. Cell Identity includes both an eNB Identity of the target eNB and a cell identifier for a cell controlled by the target eNB. This step can be a continuous activity performed by the communication device 10 and may also include measurement of the different cells in different MNO networks for selection of specific target cell in step 4.

Step 3: The communication device 10 optionally performs pre-attach (incl. pre-authentication) and pre-establishment of user plane in the MNO network. The only mandatory part is the pre-authentication as there is a need to establish security context between the communication device 10 and the target MME in the MNO network. Rest of the needed information can be provided to the target MME as part of communication device triggered handover preparation (in step 5). The need for this step depends on a) if the communication device is already attached in the MNO network and b) if there is a need to establish additional user plane bearers for the communication device in the MNO network before handover to the MNO network.

Step 4. The communication device 10 identifies the need to perform resume preparation towards one of the MNO networks. The need to perform resume preparation may be based on both local measurements of the current NH cell and measurements of different MNO cells in the prepared MNO networks. The communication device 10 selects one target MNO cell and decides to perform resume preparation towards that cell. Note that the handover need not be imminent or the target eNB be the later selected target eNB.

Step 5. The communication device 10 triggers a new NAS message indicating communication device resume preparation required, and sends this message towards a target MME connected to the eNB controlling the selected target cell. The new NAS message contains both NAS and AS information. The main address information needed for the target MME is the eNB identity and the cell identity of the target cell selected by the communication device 10 is needed by the target eNB. This is an example of the action 112 above.

Step 6: The PDN-GW takes the new NAS PDU received in user plane from the communication device and forwards it to the SGW using GPRS Tunneling Protocol Control (GTP-C). The SGW forwards the new NAS PDU received in GTP-C towards the MME, again in GTP-C.

Step 8: The target MME builds a (S1AP) PREPARE RESUME REQUEST message based on information received in the new NAS PDU message, and also information locally available in the target MME. Information about the target cell (as received from the communication device) is included in the message. The (S1AP) PREPARE RESUME REQUEST message may also contain any AS information received by the target MME from the communication device 10.

Step 9: The target MME sends the (S1AP) PREPARE RESUME REQUEST message to the eNB. The correct eNB is identified by the eNB identity the target MME received from the communication device 10. Steps 8 and 9 are examples of the action 121 above.

Step 10. The target eNB performs resume preparation for the communication device 10 in the indicated target cell. The target eNB creates a (S1AP) PREPARE RESUME REQUEST ACKNOWLEDGE message and returns it to the target MME. The (S1AP) PREPARE RESUME REQUEST ACKNOWLEDGE message may also contain any AS information sent from the target eNB to the communication device 10, e.g. a Resume Command message.

Step 11. The target MME creates a new NAS message, communication device resume prepared.

Step 12: The target MME sends the new NAS message towards to the communication device 10 via the SGW using GTP-C. The SGW forwards the new NAS message received in GTP-C to the PDN-GW.

Step 13: The PDN-GW takes the received new NAS message and inserts it to user plane packet and sends it towards the communication device 10 (via NH-GW and NH-eNB). The communication device 10 receives the new NAS message.

Step 14. The communication device 10 performs resume to the MNO network based on the information received in the new NAS message, including any AS information sent from the target eNB to the communication device 10.

Communication device-triggered suspend/resume preparation moving between MNO→NH.

Figure 23:
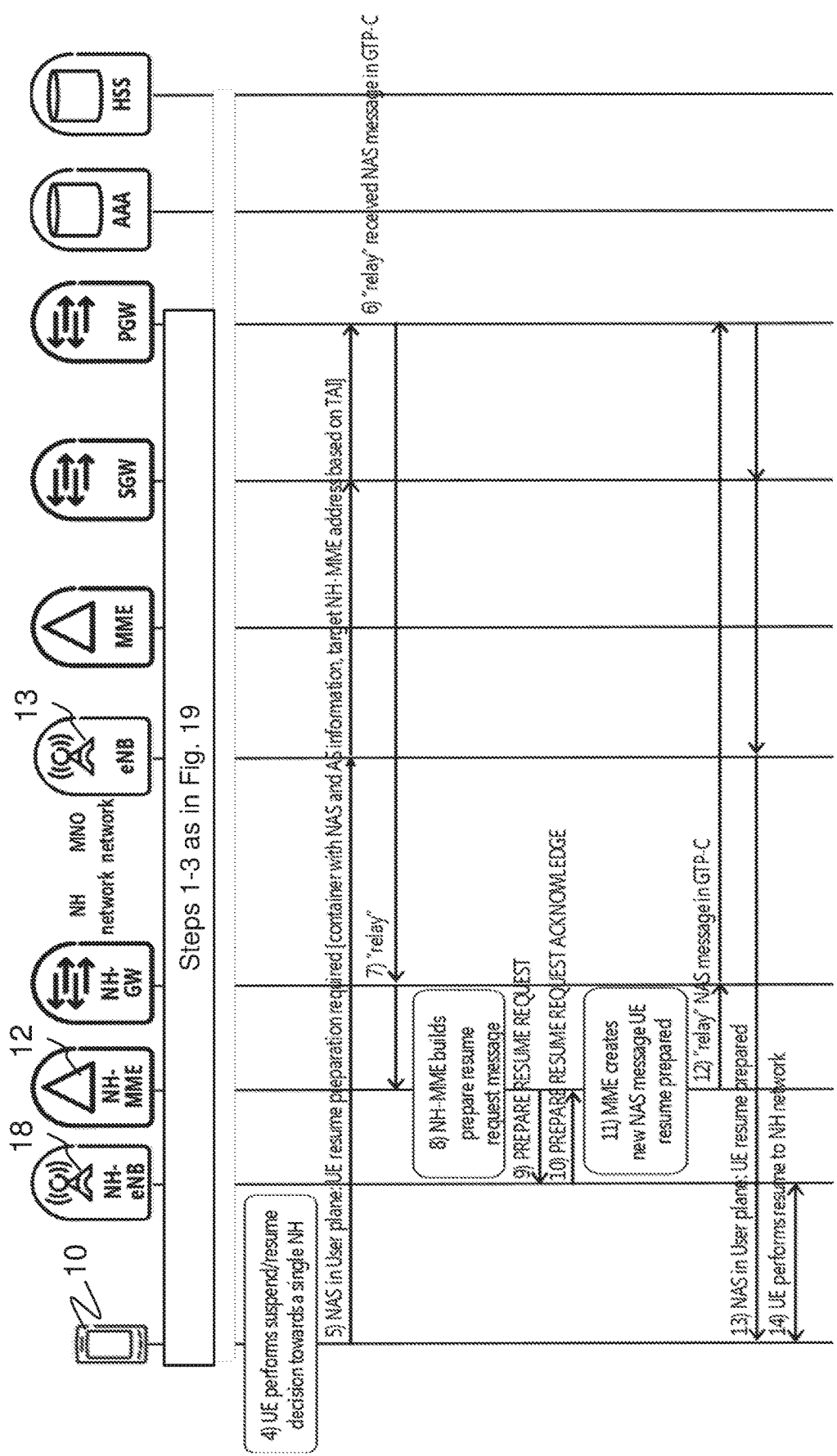
FIG. 23 is a schematic overview depicting a communication network according to embodiments herein.

The signaling path shown in FIG. 18 applies also here. FIG. 23 shows the signaling flow for communication device triggered suspend/resume preparation in the direction from MNO network to the NHO network. The different steps shown in the figure are described below. The following steps are shown in FIG. 23. FIG. 23 is quite similar to FIG. 19.

Step 1: The communication device is attached to MNO network and is in active/connected state i.e. in RRC_CONNECTED state. In control plane there are communication device contexts in eNB, MME, SGW and PGW (shown in step 1a). In user plane, there are UE contexts in eNB, SGW and PGW (shown in step 1b).

Step 2: The communication device 10 detects a cell controlled by NH-eNB and reads the needed system information. SIB1 contains the PLMN-ID, Tracking Area Code and Cell Identity. The PLMN-ID and the TAC comprise the TAI that can be used to identify a target NH-MME in the NH network. Cell Identity includes both an eNB Identity of the target NH-eNB and a cell identifier for a cell controlled by the target NH-eNB. This step can be a continuous activity performed by the communication device 10 and may also include measurement of the different cells in different NH networks for selection of specific target cell in step 4.

Step 3: The communication device 10 optionally performs pre-attach (incl. pre-authentication) and pre-establishment of user plane in the NH network. The only mandatory part is the pre-authentication as there is a need to establish security context between the communication device 10 and the target NH-MME in the NH network. Rest of the needed information can be provided to the target NH-MME as part of communication device triggered handover preparation (in step 5). The need for this step depends on a) if the communication device is already attached in the NH network and b) if there is a need to establish additional user plane bearers for the communication device 10 in the NH network before handover to the NH network.

Step 4: The communication device 10 identifies the need to perform suspend/resume preparation towards one of the NH-MNO networks. The need to perform resume preparation may be based on both local measurements of the current MNO cell and measurements of different NH cells in the prepared NH networks. The communication device 10 selects one target NH cell and decides to perform resume preparation towards that cell.

Step 5: The communication device 10 triggers a new NAS message indicating communication device resume preparation required, and sends this message towards a target NH-MME connected to the NH-eNB controlling the selected target cell. The new NAS message contains both NAS and AS information. The main address information needed for the target NH-MME is the NH-eNB identity and the cell identity of the target NH cell selected by the communication device is needed by the target NH-eNB. This is an example of the action 112 above.

Step 6: The PDN-GW takes the new NAS PDU received in user plane from the communication device 10 and forwards it to the NH-GW using GTP-C.

Step 7: The NH-GW forwards the new NAS PDU received in GTP-C towards the NH-MME, again in GTP-C.

Step 8: The target NH-MME builds a (S1AP) PREPARE RESUME REQUEST message based on information received in the new NAS PDU message, and also information locally available in the target NH-MME. Information about the target NH cell (as received from the communication device 10) is included in the message. The (S1AP) PREPARE RESUME REQUEST message may also contain any AS information received by the target NH-MME from the communication device 10.

Step 9: The target NH-MME sends the (S1AP) PREPARE RESUME REQUEST message to the NH-eNB. The correct NH-eNB is identified by the eNB identity the target NH-MME received from the communication device 10. The steps 8 and 9 are examples of action 121.

Step 10: The target NH-eNB performs resume preparation for the communication device 10 in the indicated target NH cell. The target NH-eNB creates a (S1AP) PRE- PARE RESUME REQUEST ACKNOWLEDGE message and returns it to the target NH-MME. The (S1AP) PREPARE RESUME REQUEST ACKNOWLEDGE message may also contain any AS information sent from the target NH-eNB to the communication device 10, e.g. a Resume Command message.

Step 11. The target NH-MME creates a new NAS message, communication device resume prepared.

Step 12: The target NH-MME sends the new NAS message towards to the communication device 10 via the NH-GW using GTP-C. The NH-GW forwards the new NAS message received in GTP-C to the PDN-GW.

Step 13: The PDN-GW takes the received new NAS message and inserts it to user plane packet and sends it towards the communication device 10 (via SGW and eNB). The communication device 10 receives the new NAS message.

Step 14: The communication device 10 performs resume to the NH network based on the information received in the new NAS message.

Below is it described how embodiments may be applied when other than S2a interface based solutions are used to connect the different wireless communication networks exemplified herein as PLMNs.

Figure 24:
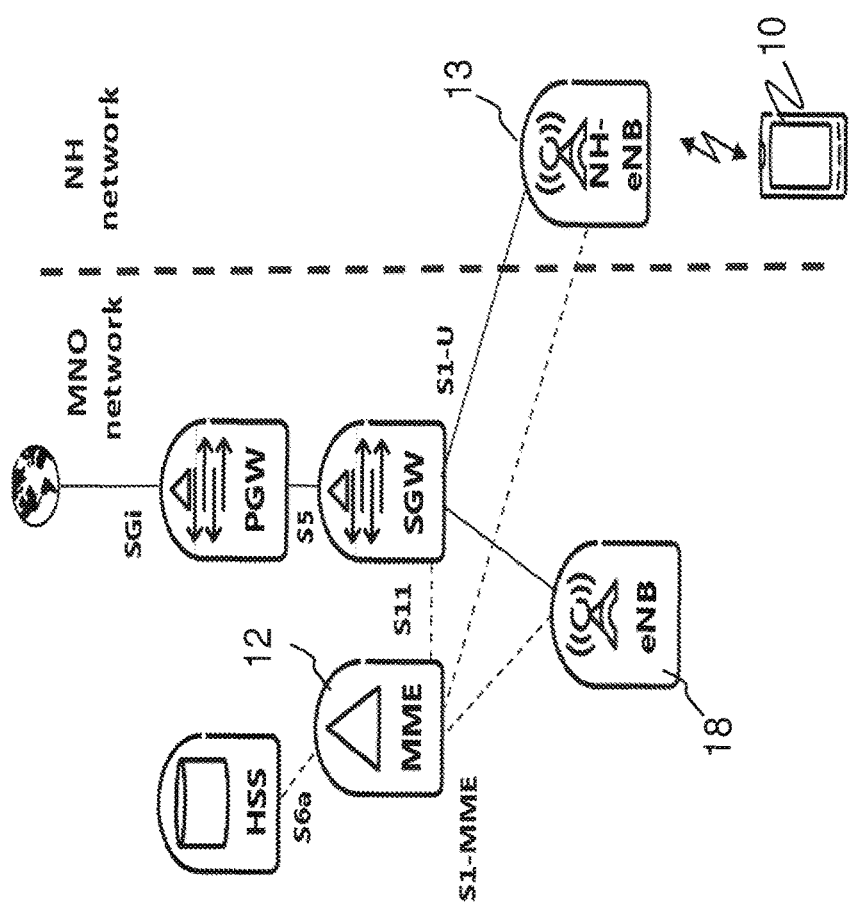
FIG. 24 is a schematic overview depicting a communication network according to embodiments herein.

FIG. 24 shows one example of S1-interface level integration between WCNs, and more specifically between a MNO network and a NH network. In this example, the NH-eNBs are connected to the MME and SGW nodes in the MNO network using S1-MME and S1-U interfaces. FIG. 24 also shows a single communication device 10 connected to the NH-eNB.

The main difference towards the S2a-interface based solution is the signaling path between the communication device 10 and the second radio network node 18. For mobility preparation (either handover preparation or suspend/resume preparation) in the direction from NH network to the MNO network the following signaling paths are possible in both directions:

Communication device-NH-eNB (being an example of the first radio network node 13)-SGW-MME (being an example of the first network node 12)-eNB (being an example of the second radio network node 18)

Communication device-NH-eNB-SGW-PGW-SGW-MME-eNB

The same principle applies also for the direction MNO network to NH network (not shown in any figure). Examples of this signaling path are following:

Communication device-eNB (being an example of the first radio network node 13)-SGW-MME (being an example of the first network node 13)-NH-eNB (being an example of the second radio network node 18)

Communication device-eNB-SGW-PGW-SGW-MME-NH-eNB

The same principles can also be applied if it can be assumed that the MNO eNBs would be directly connected to NH network using S1 interface.

Figure 25:
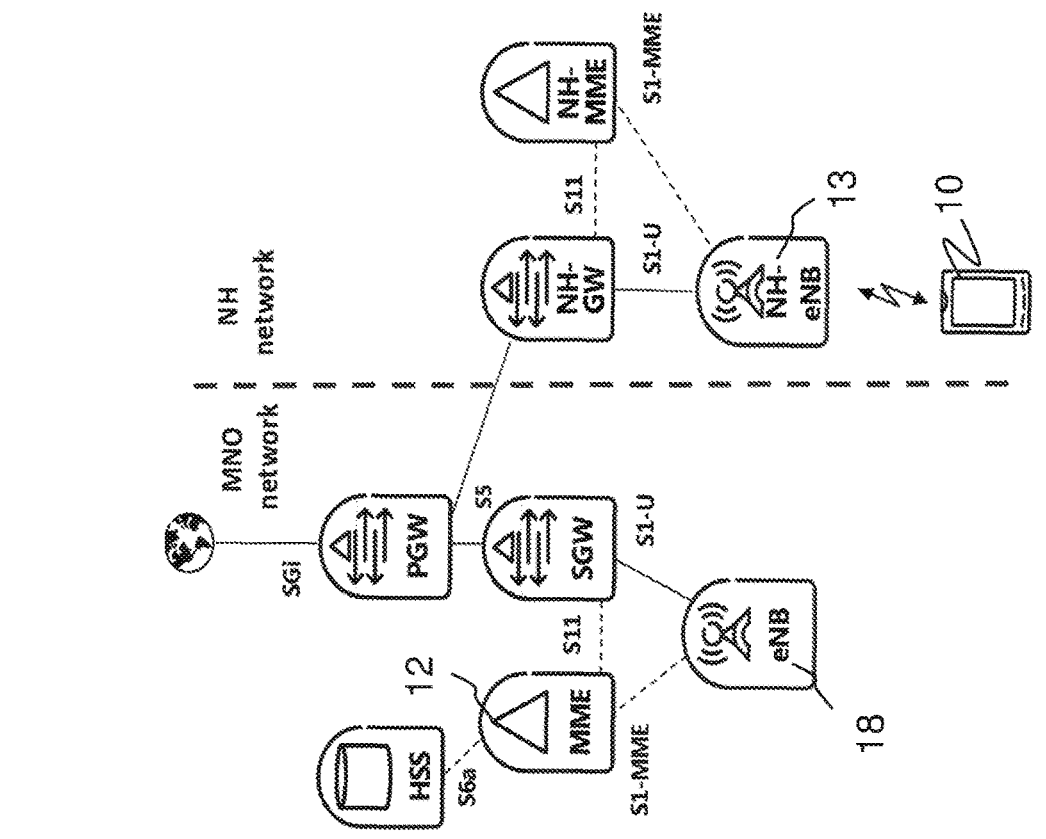
FIG. 25 is a schematic overview depicting a communication network according to embodiments herein.

FIG. 25 shows one example of S5/S8-interface level integration between WCNs, and more specifically between a MNO network and a NH network. The S5/S8-level of integration is typically used in different roaming scenarios, including both international and national roaming. The current naming convention is that the S5 interface name is used within a WCN and S8 interface name is used between different WCNs. In this example, the NH-GW is connected to the MNO PDN-GW using S5/S8 interface. FIG. 25 also shows a single communication device 10 connected to the NH-eNB.

The main difference towards the S2a-interface based solution is the signaling path between the communication device 10 and the target radio network node. For mobility preparation (either handover preparation or suspend/resume preparation) in the direction from NH network to the MNO network the following signaling paths are possible in both directions:

Communication device-NH-eNB (being an example of the first radio network node 13)-NH-GW-PGW-SGW-MME (being an example of the first network node 12)-eNB (being an example of the second radio network node 18) The same principle applies also for the direction MNO network to NH network (not shown in any figure). Example of this signaling path is following:

Communication device-eNB (being an example of the first radio network node 13)-SGW-PGW-NH-GW-NH-MME (being an example of the first network node 12)-NH-eNB (being an example of the second radio network node 18)

The same principles can also be applied if it can be assumed that the MNO SGW would be connected to the NH network using S5/S8 interface.

Figure 26:
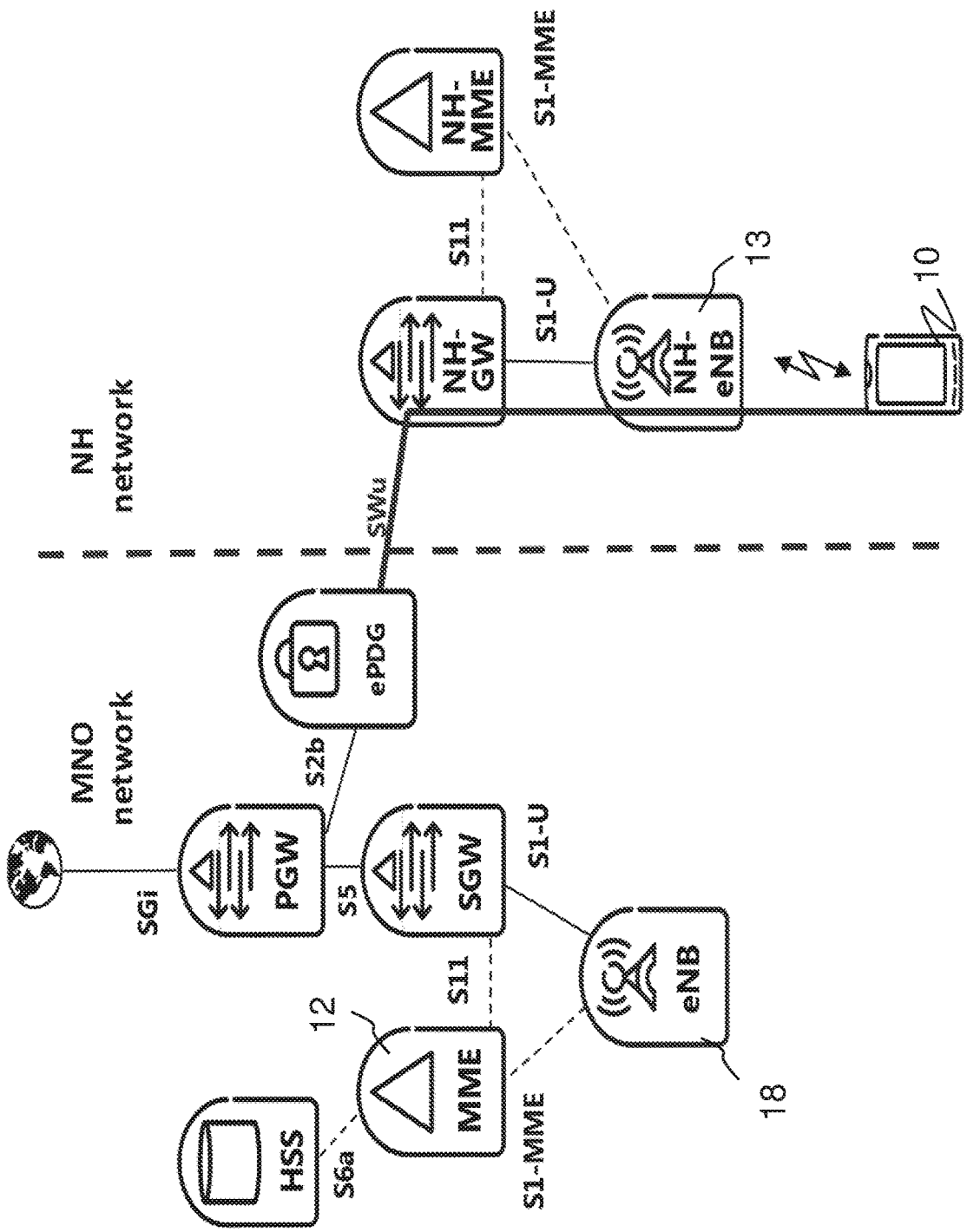
FIG. 26 is a schematic overview depicting a communication network according to embodiments herein.

FIG. 26 shows one example of S2b-interface level integration between PLMNs, and more specifically between a MNO network and a NH network. In this example, the MNO network includes an ePDG-node that is connected via the S2b interface to the MNO PDN-GW. There is also an SWu-interface from the communication device 10 to the ePDG that is using user plane connectivity in the NH network (i.e. via NH-eNB and NH-GW). FIG. 26 also shows a single communication device connected to the NH-eNB. In this case the ePDG is not directly connected to the control plane part of EPC i.e. to MME.

The main difference towards the S2a-interface based solution is the signaling path between the communication device 10 and the target radio network node. For mobility preparation (either handover preparation or suspend/resume preparation) in the direction from NH network to the MNO network the following signaling paths are possible in both directions:

Communication device-NH-eNB (being an example of the first radio network node 13)-NH-GW-ePDG-PGW-SGW-MME (being an example of the first network node 12)-eNB (being an example of the second radio network node 18)

The same principle applies also for the direction MNO network to NH network (not shown in any figure). One example of this case is the following signaling path. This assumes that the ePDG is able to communicate with the NH-GW:

Communication device-eNB (being an example of the first radio network node 13)-SGW-PGW-ePDG-NH-GW-NH-MME (being an example of the first network node 12)-NH-eNB (being an example of the second radio network node 18)

The same principles can also be applied if it can be assumed that the NH network contains an ePDG node. In that case the signaling path is:

Communication device-eNB-SGW-PGW-NH-ePDG-NH-GW-NH-MME-NH-eNB

Figure 27:
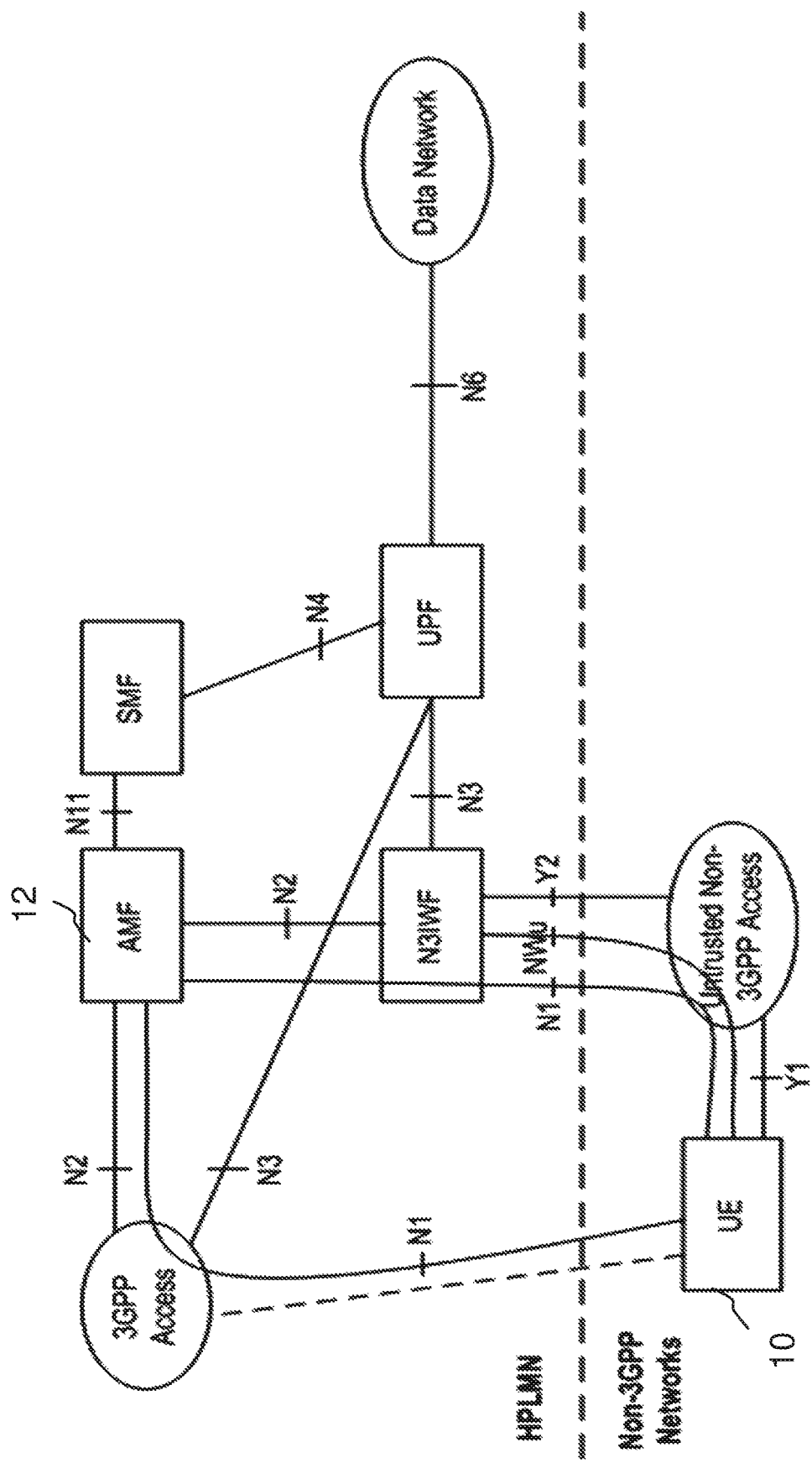
FIG. 27 is a schematic overview depicting a communication network according to embodiments herein.

FIG. 27 shows an example of the ongoing 5G standardization work for non-3GPP access integration and therefore 5G terminology is used in this figure. The source is 3GPP TS 23.501 v1.4.0 and the different functions are defined in that specification.

This architecture is based on S2b solution and the main difference is that the Non-3GPP InterWorking Function (N3IWF) function is connected to both control and user plane nodes in the packet core network. If described in the context of the S2b-interface based solution then it would mean that the ePDG is connected to both MME and SGW (instead of PDN-GW only). This is shown as N3IWF (similar to ePDG) being connected to Access and Mobility Management Function (AMF) (subset of MME functionality) and User Plane Function (UPF) (corresponding to subset of SGW and PGW functionality). In addition, the communication device has a N1-interface towards the AMF (both via 3GPP and non-3GPP access) and this interface is used for NAS-signaling.

The main difference towards the S2a-interface based solution is the signaling path between the communication device 10 and the target radio network node. For mobility preparation (either handover preparation or suspend/resume preparation) in the direction from NH network to the MNO network the following signaling paths are possible in both directions:

Communication device—Untrusted non 3GPP access-N3IWF-AMF (being an example of the first network node 12)-3GPP RAN node such as gNB (being an example of the second radio network node 18)

The "Untrusted non 3GPP access" can also in this case consist of NH-eNB and NH-GW in the user plane.

The same principle applies also for the direction MNO network to NH network (not shown in any figure). One example of this case is the following signaling path. This assumes that the N3IWF is able to communicate with a node in the "Untrusted non 3GPP-access" (e.g. the NH-GW):

Communication device-gNB (being an example of the first radio network node 13)-UPF-N3IWF-NH-GW-NH-MME (being an example of the first network node 12)-NH-eNB (being an example of the second radio network node 18).

The same principles can also be applied if it can be assumed that the NH network contains an N3IWF node.

Figure 28:
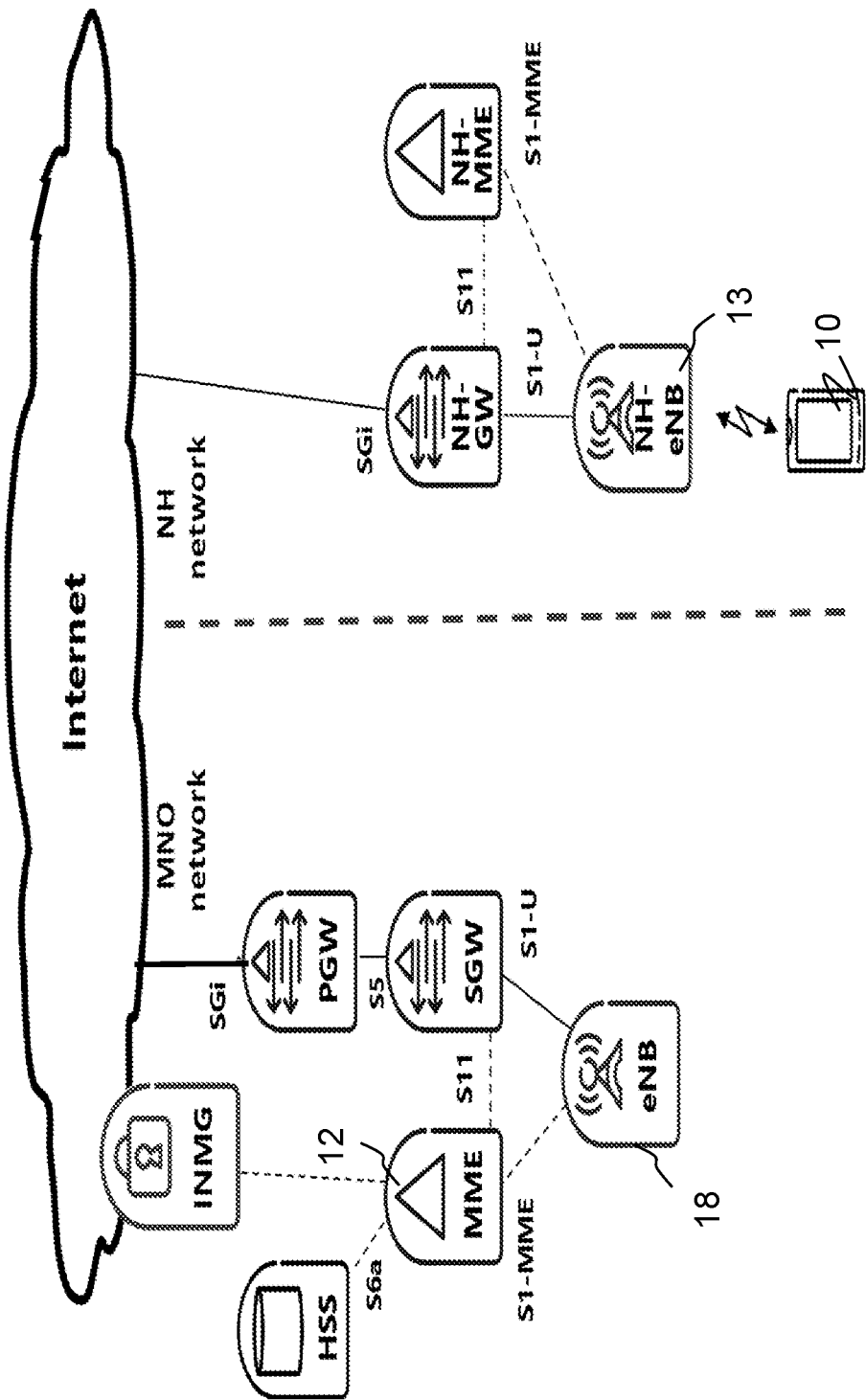
FIG. 28 is a schematic overview depicting a communication network according to embodiments herein.

FIG. 28 shows one example of "no integration" case. In this case, the MNO network includes an Inter-Network Mobility Gateway (INMG) that is connected both to the Internet and to control plane in EPC, i.e. the MME, in the MNO network. FIG. 28 also shows a single communication device 10 connected to the NH-eNB.

The main difference towards the S2a-interface based solution is the signaling path between the communication device 10 and the target radio network node. For mobility preparation (either handover preparation or suspend/resume preparation) in the direction from NH network to the MNO network the following signaling paths are possible in both directions:

Communication device-NH-eNB (being an example of the first radio network node 13)-NH-GW-Internet-INMG-MME (being an example of the first network node 12)-eNB (being an example of the second radio network node 18)

The same principle applies also for the direction MNO network to NH network (not shown in any figure) if it can be assumed that the NH network contains an INMG node.

Figure 29:
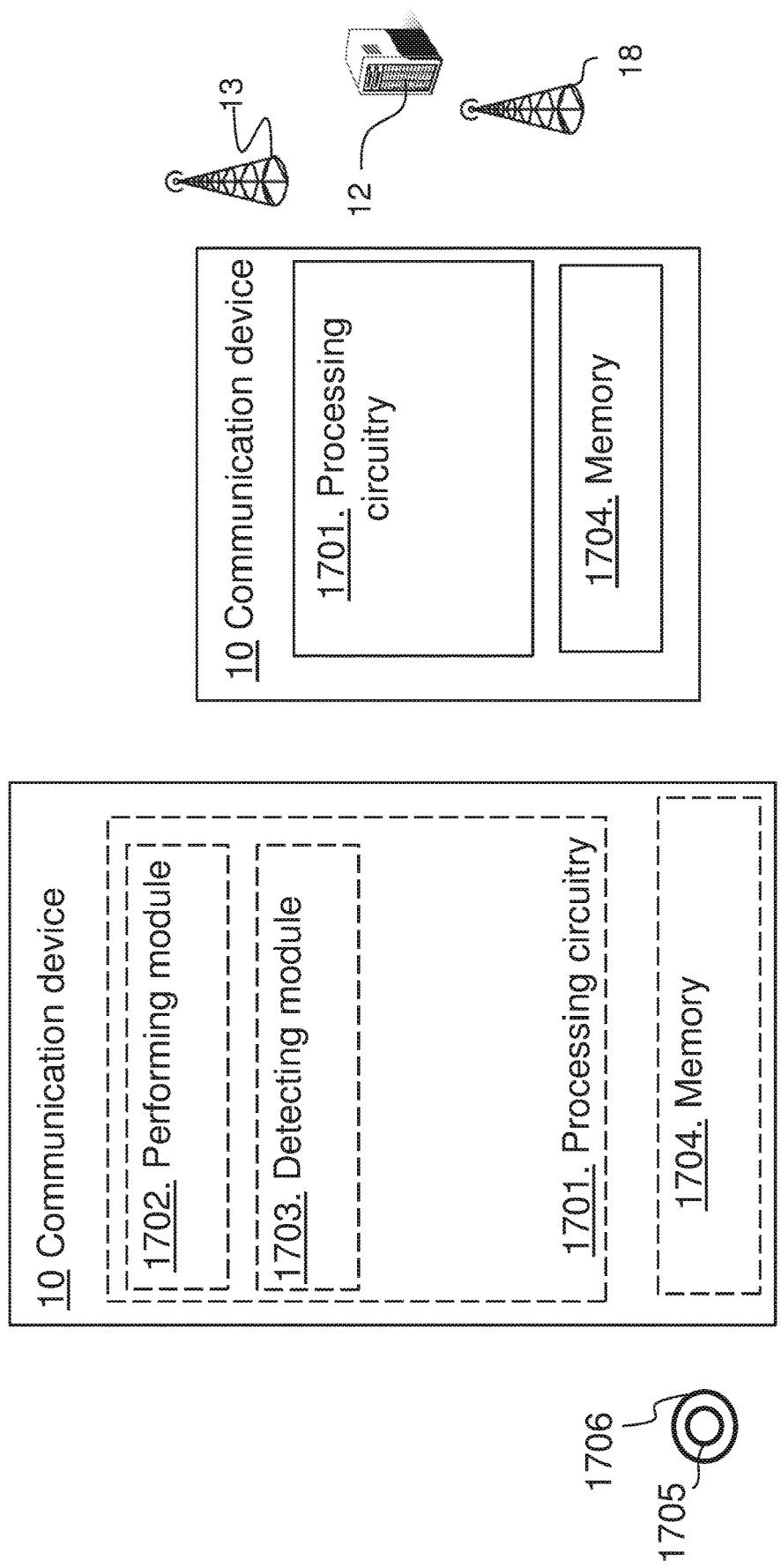
FIG. 29 shows a block diagram depicting a communication device according to embodiments herein.

FIG. 29 is a block diagram depicting the communication device 10 for handling communication in the communication network comprising at least the first wireless communication network 11 and the second wireless communication network 14. The communication device 10 is configured to operate in the second wireless communication network 14 comprising the first radio network node 13, i.e. second wireless communication network comprises the second radio network node 13 configured to serve the communication device 10.

The communication device 10 may comprise processing circuitry 1701, such as one or more processors, configured to perform the methods herein.

The communication device 10 may further comprise a performing module 1702. The communication device 10, the processing circuitry 1701, and/or the performing module 1702 is configured to perform the preparation signaling, via the first radio network node 13 and transparently through the second wireless communication network 14, with the first network node 12 of the first wireless communication network 11 for preparing the first network node 12 and the second radio network node 18 in the first radio access network of the first communication network 11 with the pre-configuration for serving the communication device 10. The preparation signaling comprises radio access network data, e.g. AS data, and core network data, NAS data, of the communication device 10. The radio access network data may comprise information for creation of communication device context in the first radio access network of the first wireless communication network 11. The radio access network data may be intended for the second radio network node 18 in the first radio access network of the first wireless communication network 11. The communication device 10, the processing circuitry 1701, and/or the performing module 1702 may be configured to perform the preparation signaling by being configured to receive, from the first network node 12, the preparation indication referencing the communication device context at the second radio network node 18 in the first radio access network of the first wireless communication network 11. The preparation signaling may comprise handover preparation signalling and/or resume preparation signalling.

The communication device 10 may further comprise a detecting module 1703, e.g. a receiver or a transceiver. The communication device 10, the processing circuitry 1701, and/or the detecting module 1703 may be configured to identify the cell of the second radio network node 18 in the first radio access network of the first wireless communication network 11 to trigger the performing of the preparation signaling.

It should be noted that the communication network may further comprise additional wireless communication networks such as the third wireless communication network and the communication device 10, the processing circuitry 1701, and/or the performing module 1702 may be configured to perform the preparation signaling, via the radio network node 13 and transparently through the second wireless communication network, to a third network node of a third wireless communication network for preparing the third network node and a third RAN node.

The communication device 10 further comprises a memory 1704. The memory comprises one or more units to be used to store data on, such as communication device context, preparation indications, SIM modules, preparation indications, applications to perform the methods disclosed herein when being executed, and similar.

The methods according to the embodiments described herein for the communication device 10 are respectively implemented by means of e.g. a computer program 1705 or a computer program product, comprising instructions, i.e., software code portions, which, when executed on at least one processor, cause the at least one processor to carry out the actions described herein, as performed by the communication device 10. The computer program 1705 may be stored on a computer-readable storage medium 1706, e.g. a disc or similar. The computer-readable storage medium 1706, having stored thereon the computer program, may comprise the instructions which, when executed on at least one processor, cause the at least one processor to carry out the actions described herein, as performed by the communication device 10. In some embodiments, the computer-readable storage medium may be a non-transitory computer-readable storage medium.

Figure 30:
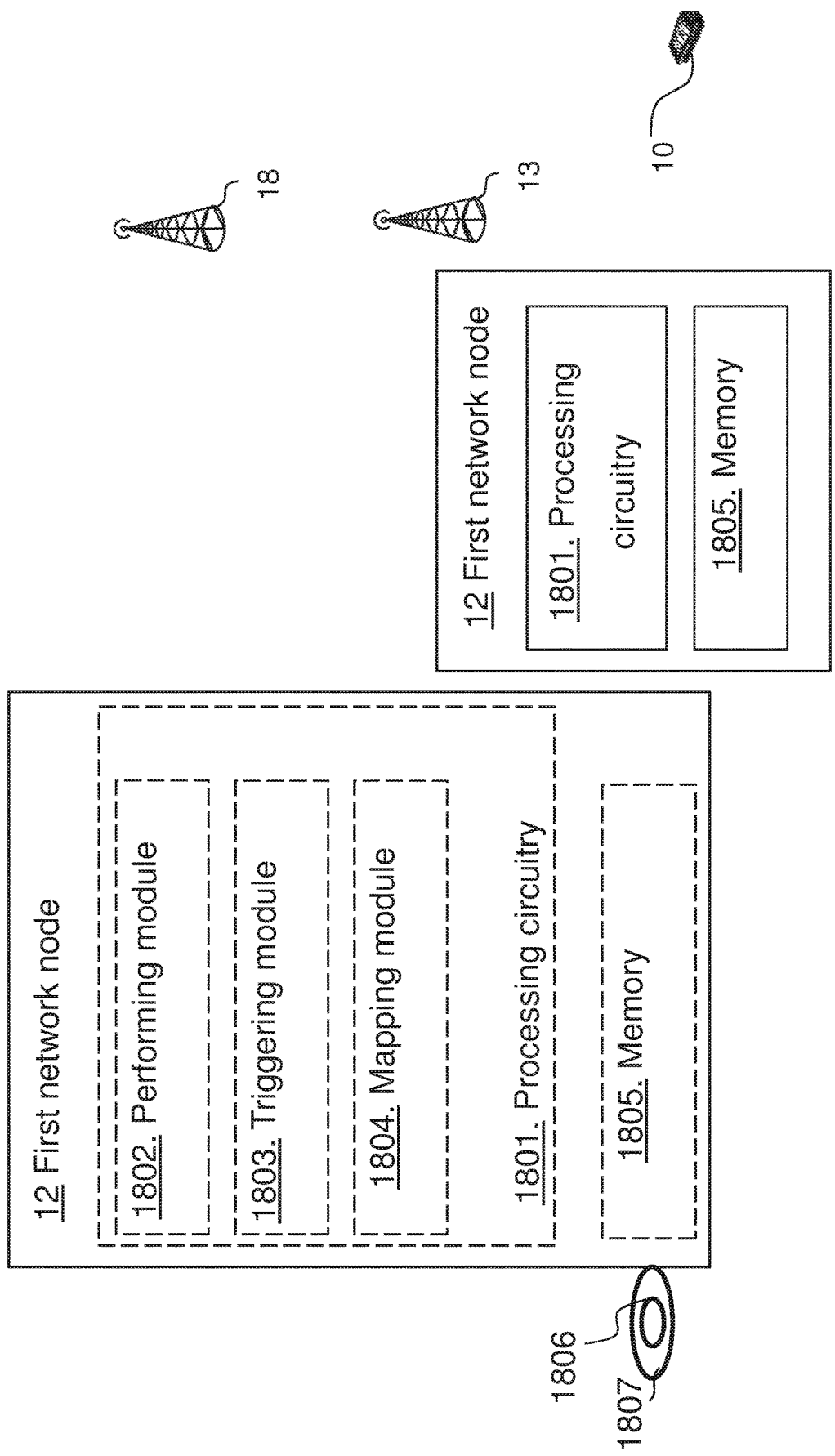
FIG. 30 shows a block diagram depicting a first network node according to embodiments herein.

FIG. 30 is a block diagram depicting the first network node 12, such as an MME or gateway, for handling communication of the communication device 10 in the communication network comprising at least the first wireless communication network 11 and the second wireless communication network 14. The first network node 12 is configured to operate in the first wireless communication network 11. The first radio network node 13 is comprised in the second wireless communication network 14 and configured to serve the communication device 10. Thus, the communication device 10 is served by the first radio network node 13 comprised in the second wireless communication network 14.

The first network node 12 may comprise processing circuitry 1801, e.g. one or more processors, configured to perform the methods herein.

The first network node 12 comprises a performing module 1802. The first network node 12, the processing circuitry and/or the performing module 1802 is configured to perform the preparation signaling with the communication device 10, via the first radio network node 13 and transparently through the second wireless communication network 14, for preparing the first network node 12 and the second radio network node 18 in the first radio access network of the first communication network 11 with the pre-configuration for serving the communication device 10. The preparation signalling, from the communication device 10, comprises radio access network data and core network data of the communication device 10. The first network node 12, the processing circuitry and/or the performing module 1802 may be configured to perform the preparation signaling by being configured to provide, to the communication device 10, the preparation indication referencing the communication device context at the second radio network node 18 in the first radio access network of the first wireless communication network 11. The preparation signaling may comprise handover preparation signalling and/or resume preparation signalling.

The first network node 12 comprises a triggering module 1803. The first network node 12, the processing circuitry and/or the triggering module 1803 may be configured to, when the radio access network data comprises information for creation of a communication device context in the first radio access network of the first wireless communication network 11, trigger the creation of the communication device context in the second radio network node 18 in the first radio access network of the first wireless communication network 11 based on the information.

The first network node 12 comprises a mapping module 1804. The first network node 12, the processing circuitry and/or the mapping module 1804 may be configured to, when the radio access network data is intended for the second radio network node 18 of the first wireless communication network 11, map the radio access network data and/or the core network data received over the user plane interface to the control signalling over the control plane interface to the second radio network node 18.

The first network node 12 further comprises a memory 1805. The memory comprises one or more units to be used to store data on, such as context, preparation indications, mappings, access data, applications to perform the methods disclosed herein when being executed, and similar.

The methods according to the embodiments described herein for the first network node 12 are respectively implemented by means of e.g. a computer program 1806 or a computer program product, comprising instructions, i.e., software code portions, which, when executed on at least one processor, cause the at least one processor to carry out the actions described herein, as performed by the first network node 12. The computer program 1806 may be stored on a computer-readable storage medium 1807, e.g. a disc or similar. The computer-readable storage medium 1807, having stored thereon the computer program, may comprise the instructions which, when executed on at least one processor, cause the at least one processor to carry out the actions described herein, as performed by the first network node 12. In some embodiments, the computer-readable storage medium may be a non-transitory computer-readable storage medium.

Figure 31:
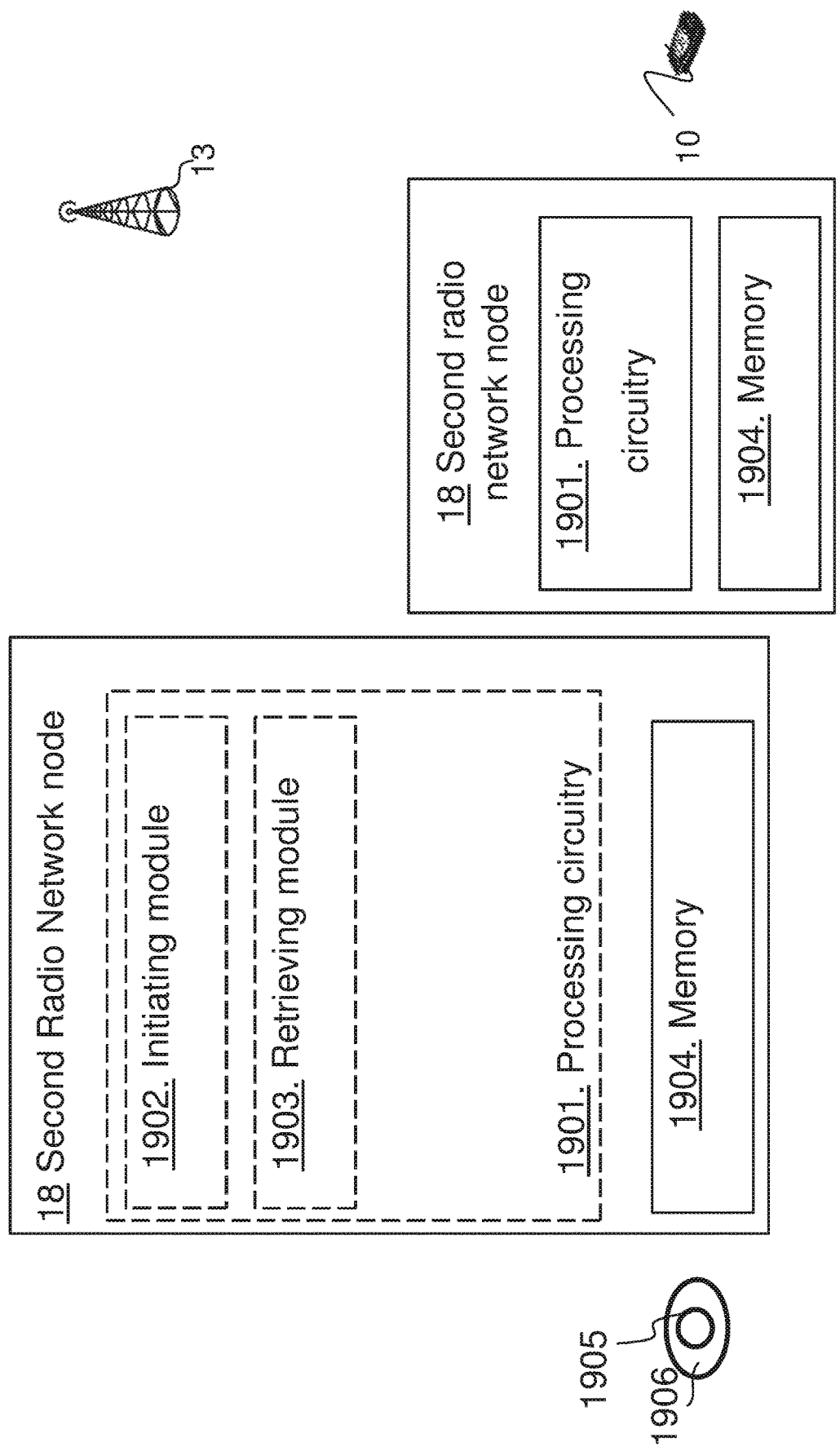
FIG. 31 shows a block diagram depicting a second radio network node according to embodiments herein.

FIG. 31 is a block diagram depicting the second radio network node 18 for handling communication of the communication device 10 in the communication network comprising at least the first wireless communication network and the second wireless communication network. The second radio network node 18 is configured to operate in the first radio access network in the first wireless communication network 11. For example, the second radio network node 18 is configured for the first wireless communication network, and the communication device 10 is served by the first radio network node 13 comprised in the second wireless communication network.

The network node may comprise processing circuitry 1901, e.g. one or more processors, configured to perform the methods herein.

The network node comprises an initiating module 1902. The network node, the processing circuitry 1901 and/or the initiating module 1902 is configured to initiate, upon the communication device 10 initiating an access to the cell of the second radio network node 18, an abbreviated access process, for the communication device 10, to the first radio access network in the first wireless communication network 11. The abbreviated access process comprises: receiving, from the communication device 10, the preparation indication, such as a resume ID or handover ID, indicating the abbreviated access process. The preparation indication references the communication device context for the communication device 10 in the first radio access network of the first wireless communication network 11. The communication device context is configured from the preparation signaling from the communication device in the second wireless communication network 14 via the first radio network node 13 in the second wireless communication network 14 and transparently through the second wireless communication network 14. The preparation signaling comprises providing the preparation indication to the communication device. The initiated abbreviated access process may for resume signaling or for handover signaling.

The network node, the processing circuitry 1901 and/or the initiating module 1902 is further configured to retrieve information related to the pre-configuration for serving the communication device for the initiated abbreviated access process using the preparation indication.

The network node comprises a retrieving module 1903. The network node, the processing circuitry 1901 and/or the retrieving module 1903 may be configured to retrieve information related to the communication device context for serving the communication device 10 for the initiated abbreviated access process using the preparation indication. The network node, the processing circuitry 1901 and/or the retrieving module 1903 may be configured to retrieve the information from another network node or from the second radio network node (stored locally).

The network node further comprises a memory 1904. The memory comprises one or more units to be used to store data on, such as context, preparation indications, access process data, access data, applications to perform the methods disclosed herein when being executed, and similar.

The methods according to the embodiments described herein for the network node are respectively implemented by means of e.g. a computer program 1905 or a computer program product, comprising instructions, i.e., software code portions, which, when executed on at least one processor, cause the at least one processor to carry out the actions described herein, as performed by the network node. The computer program 1905 may be stored on a computer-readable storage medium 1906, e.g. a disc or similar. The computer-readable storage medium 1906, having stored thereon the computer program, may comprise the instructions which, when executed on at least one processor, cause the at least one processor to carry out the actions described herein, as performed by the network node. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a communication device, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communication devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a communication device for handling communication in a communication network comprising a first wireless communication network and a second wireless communication network that includes a first radio network node (RNN) serving the communication device, the method comprising identifying a cell of a second RNN in a first radio access network (RAN) of the first wireless communication network; and in response to identifying the cell, performing a preparation signaling, with a first network node of the first wireless communication network, for preparing the first network node and the second RNN in the first RAN of the first communication network with a pre-configuration for serving the communication device, wherein:

the preparation signaling is performed, as a user plane message, via the first RNN and transparently through the second wireless communication network;

the preparation signaling comprises RAN data and core network data associated with the communication device;

the RAN data comprises:

data associated with the identified cell, the data being is intended for the second RNN in the first RAN, and information identifying the second RNN, the information being intended for the first network node; and the preparation signaling further comprises further handover preparation signaling and/or resume preparation signaling.

2. The method according to claim 1 wherein at least one of the following applies:

the RAN data comprises information for creation of communication device context in the first RAN of the first wireless communication network; and performing the preparation signaling comprises receiving, from the first network node via the user plane, a preparation indication referencing a communication device context at the second RNN in the first RAN of the first wireless communication network.

3. A non-transitory, computer-readable storage medium having stored thereon computer-executable instructions that, when executed by processing circuitry of a communication device, configure the communication device to perform operations corresponding to claim 1.

4. A method, performed by a first network node in a first wireless communication network, for handling communication of a communication device in a communication network comprising the first wireless communication network and a second wireless communication network that includes a first radio network node (RNN) serving the communication device, the method comprising:

performing preparation signaling, with the communication device via a user plane interface, for preparing the first network node and a second RNN in a first radio access network (RAN) of the first communication network with a pre-configuration for serving the communication device, wherein:

the preparation signaling is performed via the first RNN and transparently through the second wireless communication network;

the preparation signaling comprises RAN data and core network data associated with the communication device;

the RAN data comprises:

cell identity data intended for the second RNN in the first RAN, and information identifying the second RNN, the information being intended for the first network node, and the preparation signaling further comprises further handover preparation signaling and/or resume preparation signaling; and mapping at least one of the RAN data and the core network data, received in the preparation signaling over the user plane interface, to control signaling over a control plane interface to the second RNN.

5. The method according to claim 4 wherein:
the RAN data comprises information for creation of a communication device context in the first RAN of the first wireless communication network; and
the method further comprises, based on the information, triggering creation of the communication device context in the second RNN in the first RAN of the first wireless communication network.

6. The method according to claim 4, wherein performing the preparation signaling comprises providing, to the communication device via a user plane interface, a preparation indication referencing a communication device context at the second RNN in the first RAN of the first wireless communication network.

7. A non-transitory, computer-readable storage medium having stored thereon computer-executable instructions that, when executed by processing circuitry of a first network node in a first wireless communication network, configure the first network node to perform operations corresponding to claim 4.

8. A method, performed by a second radio network node (RNN) serving a cell in a first radio access network (RAN) of a first wireless communication network, for handling communication of a communication device in a communication network comprising the first wireless communication network and a second wireless communication network, the communication device initiates an access to a cell of the second RNN, the method comprising:
receiving, from the communication device, a preparation indication that indicates an abbreviated access process initiated by the communication device to the cell in the first RAN of the first wireless communication network, wherein:
the abbreviated access process is for resume signaling or for handover signaling,
the preparation indication references a communication device context, for the communication device, in the first RAN of the first wireless communication network, and
the communication device context in the first RAN is configured based on preparation signaling comprising a user-plane message between the communication device and a first network node, of the first wireless communication network, via the first RNN and transparently through the second wireless communication network, and
retrieving information related to the communication device context for the initiated abbreviated access process using the preparation indication.

9. A non-transitory, computer-readable storage medium having stored thereon computer-executable instructions that, when executed by processing circuitry of a second radio network node (RNN) serving a cell in a first radio access network (RAN) of a first wireless communication network, configure the second RNN to perform operations corresponding to claim 8.

10. A communication device configured to handle communication in a communication network comprising a first wireless communication network and a second wireless communication network that includes a first radio network node (RNN) serving the communication device, the communication device comprising processing circuitry configured to:
identify a cell of a second RNN in a first radio access network (RAN) of the first wireless communication network; and
in response to identifying the cell, perform a preparation signaling, with a first network node of the first wireless communication network, for preparing the first network node and the second RNN in the first RAN of the first communication network with a pre-configuration for serving the communication device, wherein:
the preparation signaling is performed, as a user plane message, via the first RNN and transparently through the second wireless communication network;
the preparation signaling comprises RAN data and core network data associated with the communication device;
the RAN data comprises:
data associated with the identified cell, the data being is intended for the second RNN in the first RAN, and
information identifying the second RNN, the information being intended for the first network node; and
the preparation signaling further comprises further handover preparation signaling and/or resume preparation signaling.

11. The communication device according to claim 10, wherein at least one of the following applies:
the RAN data comprises information for creation of communication device context in the first RAN of the first wireless communication network; and
performing the preparation signaling comprises receiving, from the first network node via the user plane, a preparation indication referencing a communication device context at the second RNN in the first RAN of the first wireless communication network.

12. A first network node, in a first wireless communication network, configured to handle communication of a communication device in a communication network comprising the first wireless communication network and a second wireless communication network that includes a first radio network node (RNN) configured to serve the communication device, the first network node comprising processing circuitry configured to:
perform preparation signaling, with the communication device via a user plane interface, for preparing the first network node and a second RNN in a first radio access network (RAN) of the first communication network with a pre-configuration for serving the communication device, wherein:
the preparation signaling is performed via the first RNN and transparently through the second wireless communication network;
the preparation signaling comprises RAN data and core network data associated with the communication device;
the RAN data comprises:
cell identity data intended for the second RNN in the first RAN, and information identifying the second RNN, the information being intended for the first network node, and the preparation signaling further comprises further handover preparation signaling and/or resume preparation signaling; and map at least one of the RAN data and the core network data, received in the preparation signaling over the user plane interface, to control signaling over a control plane interface to the second RNN.

13. The first network node according to claim 12, wherein:

the RAN data comprises information for creation of a communication device context in the first RAN of the first wireless communication network; and the processing circuitry is further configured to, based on the information, trigger a creation of the communication device context in the second RNN in the first RAN of the first wireless communication network.

14. The first network node according to claim 12, wherein the processing circuitry is configured to perform the preparation signaling based on providing, to the communication device via a user plane interface, a preparation indication referencing a communication device context at the second RNN in the first RAN of the first wireless communication network.

15. A second radio network node (RNN), configured to serve a cell in a first radio access network (RAN) in a first wireless communication network, for handling communication of a communication device in a communication network comprising the first wireless communication network and a second wireless communication network, the second radio network node comprising processing circuitry configured to:

receive, from the communication device, a preparation indication that indicates an abbreviated access process initiated by the communication device to the cell in the first RAN of the first wireless communication network, wherein:

the abbreviated access process is for resume signaling or for handover signaling, the preparation indication references a communication device context, for the communication device, in the first RAN of the first wireless communication network, and the communication device context in the first RAN is configured based on preparation signaling comprising a user-plane message between the communication device and a first network node, of the first wireless communication network, via the first RNN and transparently through the second wireless communication network, and retrieve information related to the communication device context for the initiated abbreviated access process using the preparation indication.

* * * * *